United States Patent
Balfour et al.

(10) Patent No.: US 7,718,721 B2
(45) Date of Patent: May 18, 2010

(54) POLY(ARYLENE ETHER)/POLYOLEFIN COMPOSITION, METHOD, AND ARTICLE

(75) Inventors: Kim G. Balfour, Delanson, NY (US); Vijay Mhetar, Slingerlands, NY (US); William Eugene Pecak, Cohoes, NY (US); Vijay Rajamani, Slingerlands, NY (US)

(73) Assignee: Sabic Innovative Plastics IP B.V. (NL)

( * ) Notice: Subject to any disclaimer, the term of this patent is extended or adjusted under 35 U.S.C. 154(b) by 810 days.

(21) Appl. No.: 11/559,032

(22) Filed: Nov. 13, 2006

(65) Prior Publication Data

US 2008/0114102 A1 May 15, 2008

(51) Int. Cl.
 C08K 5/3492 (2006.01)
 C08K 5/52 (2006.01)
 C08K 3/10 (2006.01)
 C08L 51/00 (2006.01)
 C08L 53/00 (2006.01)

(52) U.S. Cl. .................. 524/100; 524/141; 524/436; 525/64; 525/90; 525/91

(58) Field of Classification Search ................. 524/100, 524/141, 436; 525/64, 90, 91
See application file for complete search history.

(56) References Cited

U.S. PATENT DOCUMENTS

| | | | |
|---|---|---|---|
| 2,182,306 A | 12/1939 | Ulrich et al. |
| 2,208,095 A | 7/1940 | Esselmann et al. |
| 2,553,696 A | 5/1951 | Wilson |
| 2,792,372 A | 5/1957 | Dickson |
| 2,806,839 A | 9/1957 | Crowther et al. |
| 3,033,746 A | 5/1962 | Moyle et al. |
| 3,431,323 A | 3/1969 | Jones |
| 4,033,888 A | 7/1977 | Kiovsky |
| 4,059,654 A | 11/1977 | Von Bodungen et al. |
| 4,077,893 A | 3/1978 | Kiovsky |
| 4,166,055 A | 8/1979 | Lee, Jr. |
| 4,299,757 A | 11/1981 | Kuribayashi et al. |
| 4,427,828 A | 1/1984 | Hergenrother et al. |
| 4,578,429 A | 3/1986 | Gergen et al. |
| 4,628,072 A | 12/1986 | Shiraki et al. |
| 4,657,971 A | 4/1987 | Shiraki et al. |
| 4,670,173 A | 6/1987 | Hayashi et al. |
| 4,764,559 A | 8/1988 | Yamauchi et al. |
| 4,772,657 A | 9/1988 | Akiyama et al. |
| 4,863,997 A | 9/1989 | Shibuya et al. |
| 5,008,332 A | 4/1991 | Sano et al. |
| 5,071,912 A | 12/1991 | Furuta et al. |
| 5,075,376 A | 12/1991 | Furuta et al. |
| 5,132,363 A | 7/1992 | Furuta et al. |
| 5,159,027 A | 10/1992 | Kanayama et al. |
| 5,166,264 A | 11/1992 | Lee, Jr. et al. |
| 5,189,103 A | 2/1993 | Abe et al. |
| 5,206,276 A | 4/1993 | Lee, Jr. |
| 5,300,568 A | 4/1994 | Abe et al. |
| 5,397,822 A | 3/1995 | Lee, Jr. |
| 5,418,275 A | 5/1995 | Okada et al. |
| 5,559,184 A | 9/1996 | Furuta et al. |
| 5,596,041 A | 1/1997 | Hashiguchi et al. |
| 5,717,014 A | 2/1998 | Ohkawachi et al. |
| 6,045,883 A | 4/2000 | Akiyama et al. |
| 6,184,292 B1 | 2/2001 | Hall et al. |
| 6,201,067 B1 | 3/2001 | Cheung et al. |
| 6,291,588 B1 | 9/2001 | Nahmias et al. |
| 6,403,669 B1 | 6/2002 | Camberlin et al. |
| 6,414,081 B1 | 7/2002 | Ouhadi |
| 6,458,891 B1 | 10/2002 | Yonezawa et al. |
| 6,509,412 B1 | 1/2003 | Hall |
| 6,602,637 B1 | 8/2003 | Kurasawa et al. |
| 6,627,701 B2 | 9/2003 | Adedeji et al. |
| 6,706,350 B2 | 3/2004 | Sato et al. |
| 6,770,357 B2 | 8/2004 | Okamoto et al. |
| 6,861,472 B2 | 3/2005 | Adedeji et al. |
| 6,872,777 B2 | 3/2005 | Adedeji et al. |
| 6,875,812 B1 | 4/2005 | Akiyama et al. |
| 7,022,765 B2 | 4/2006 | Adedeji et al. |
| 7,084,347 B2 | 8/2006 | Mhetar et al. |
| 7,214,739 B2 * | 5/2007 | Kannan et al. .............. 525/133 |

(Continued)

FOREIGN PATENT DOCUMENTS

EP 0413972 A2 2/1991

(Continued)

OTHER PUBLICATIONS

International Searching Authority, International Search Report PCT/US2007/076716, Filing date: Aug. 24, 2007, Mailing date: Mar. 5, 2008, 5 pages.

(Continued)

*Primary Examiner*—Kriellion A Sanders
(74) *Attorney, Agent, or Firm*—Cantor Colburn LLP

(57) ABSTRACT

A thermoplastic composition includes the product of melt kneading a composition including a poly(arylene ether), a polyolefin, an acid-functionalized hydrogenated block copolymer of an alkenyl aromatic compound and a conjugated diene, and a polyamine compound. The composition exhibits substantially improved chemical resistance compared to a corresponding composition lacking the polyamine compound. Methods of preparing the composition and articles prepared for the composition are also described. The composition is particularly useful for fabricating halogen-free tubes for sheathing automotive wiring harnesses.

54 Claims, 1 Drawing Sheet

U.S. PATENT DOCUMENTS

| | | | |
|---|---|---|---|
| 7,582,693 B2* | 9/2009 | Kannan et al. | 524/186 |
| 2001/0047055 A1 | 11/2001 | Takeuchi et al. | |
| 2003/0149174 A1 | 8/2003 | Okamoto et al. | |
| 2003/0181584 A1 | 9/2003 | Handlin, Jr. et al. | |
| 2003/0191241 A1 | 10/2003 | Fujiwara et al. | |
| 2004/0059042 A1 | 3/2004 | Hartle et al. | |
| 2004/0102551 A1 | 5/2004 | Sato et al. | |
| 2004/0151933 A1 | 8/2004 | Ajbani et al. | |
| 2004/0157994 A1 | 8/2004 | Kubo et al. | |
| 2004/0214952 A1* | 10/2004 | Kannan et al. | 525/133 |
| 2004/0235993 A1 | 11/2004 | Yoshida et al. | |
| 2004/0251578 A1 | 12/2004 | Matthijssen et al. | |
| 2005/0004292 A1* | 1/2005 | Harashina et al. | 524/430 |
| 2005/0046070 A1 | 3/2005 | Dong et al. | |
| 2005/0064129 A1 | 3/2005 | Dong et al. | |
| 2005/0154100 A1 | 7/2005 | Kosaka et al. | |
| 2005/0182193 A1 | 8/2005 | Ajbani et al. | |
| 2005/0245679 A1 | 11/2005 | Ajbani et al. | |
| 2005/0247391 A1 | 11/2005 | Ikuta | |
| 2005/0250932 A1 | 11/2005 | Hossan et al. | |
| 2005/0277736 A1 | 12/2005 | Ajbani et al. | |
| 2005/0285086 A1 | 12/2005 | Kosaka et al. | |
| 2006/0106135 A1* | 5/2006 | Gan et al. | 523/451 |
| 2006/0131050 A1 | 6/2006 | Mhetar et al. | |
| 2006/0131052 A1 | 6/2006 | Mhetar et al. | |
| 2006/0131053 A1 | 6/2006 | Kubo et al. | |
| 2006/0131059 A1 | 6/2006 | Xu et al. | |
| 2006/0134416 A1 | 6/2006 | Kubo et al. | |
| 2006/0135661 A1 | 6/2006 | Mhetar et al. | |
| 2006/0135695 A1 | 6/2006 | Guo et al. | |

FOREIGN PATENT DOCUMENTS

| | | |
|---|---|---|
| EP | 0467113 A1 | 1/1992 |
| EP | 0541174 A1 | 5/1993 |
| EP | 0719833 A2 | 7/1996 |
| EP | 0990677 B1 | 6/2005 |
| WO | WO9936472 A1 | 7/1999 |
| WO | 02/053644 A2 | 7/2002 |
| WO | 2005014719 A1 | 2/2005 |
| WO | 2005097900 A1 | 10/2005 |
| WO | WO2006083365 A1 | 8/2006 |
| WO | 2008/060738 A1 | 5/2008 |

OTHER PUBLICATIONS

JP02242852A; Sep. 27, 1990; Human Translation; 11 pages.
JP2006299235A; Nov. 2, 2006, Human Translation; 43 pages.
JP60036550A; Feb. 25, 1980; Human Translation; 10 pages.
International Searching Authority, International Search Report, PCT/US2007/076715, Filing date: Aug. 24, 2007, Mailing date: Jul. 14, 2008, 5 pages.
International Searching Authority, Written Opinion, PCT/US2007/076715, Filing date: Aug. 24, 2007, Mailing date: Jul. 14, 2008, 5 pages.
Japanese Patent No. JP09241446; Sep. 16, 1997; Translation (17 pages).
ASTM D 790-03, "Standard Test Methods for Flexural Properties of Unreinforced and Reinforced Plastics and Electrical Insulating Materials", (11 pages), Mar. 2003.
Campbell, J. R. et al., "Copolymer Structural Requirements for Effective Compatibilization of Poly(2,6-Dimethyl-1,4-Phenylene) Oxide/Polyethylene Blends", vol. 6, pp. 439-459, 1986.
ISO 1817 International Standard, "Rubber, Vulcanized-Determination of the Effect of Liquids", Fourth Edition, Oct. 15, 2005, (20 pages).
JIS K 6251 Japanese Industrial Standard, "Rubber, Vulcanized or Thermoplastic-Determination of Tensile Stress-Strain Properties", Mar. 20, 2004, (20 pages).
Tuftec™ Brochure, Aug. 1, 2006, (19 pages).
U.S. Appl. No. 11/559,008, filed Nov. 13, 2006; Non-Final Office Action dated Jan. 27, 2009 (83 pages).
U.S. Appl. No. 11/559,008, filed Nov. 12, 2006; Final Office Action dated Jun. 23, 2009 (20 pages).

* cited by examiner

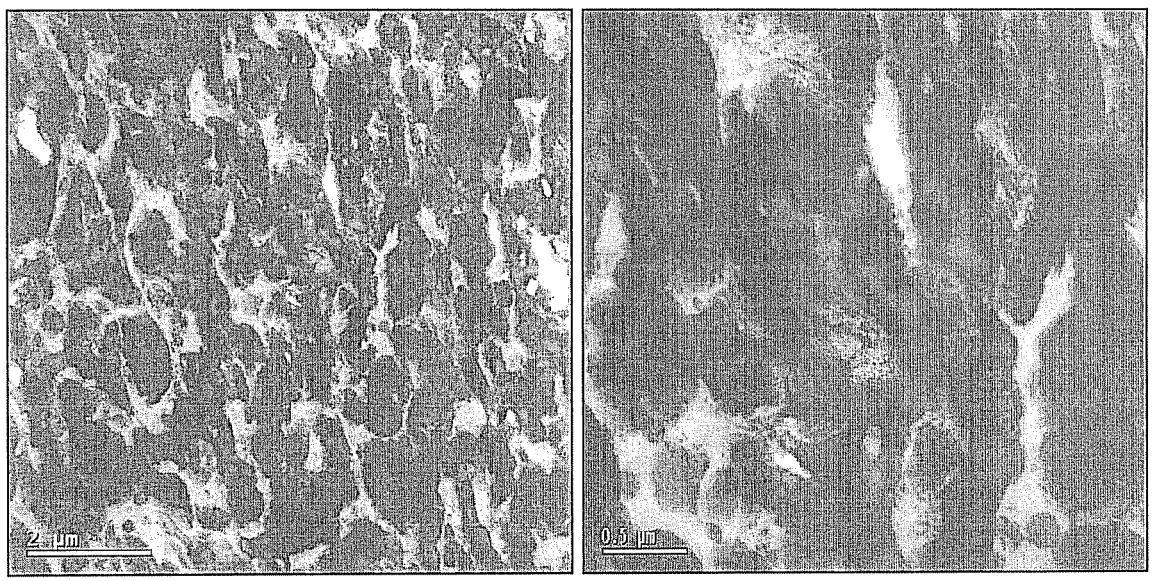
FIGURE

POLY(ARYLENE ETHER)/POLYOLEFIN COMPOSITION, METHOD, AND ARTICLE

BACKGROUND OF THE INVENTION

Poly(arylene ether) resin is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, for example, plumbing fixtures, electrical boxes, automotive parts, and coated wire.

Common plastics blended with poly(arylene ether) include polystyrenes, nylons, and polyolefins. Although polyolefins often exhibit good resistance to solvents and oils, poly (arylene ether)s tend to be less resistant to these chemicals. Therefore, blends of polyolefins and poly(arylene ether)s are often unsuitable to make plastic parts that are routinely exposed to solvents and oils. This is particularly true for underhood automotive parts, which can be exposed to gasoline, motor oil, brake fluid, and transmission fluid. Such automotive parts are often made from the halogenated resin polyvinyl chloride. There is an increasing desire to reduce or eliminate the use of halogenated resins in insulating layers due to their negative impact on the environment. In fact, many countries are beginning to mandate a decrease in the use of halogenated materials.

There is therefore an urgent need for halogen-free plastics that exhibit the physical properties and chemical resistance required for flexible underhood automotive parts.

BRIEF DESCRIPTION OF THE INVENTION

The above-described and other drawbacks are alleviated by a composition comprising the reaction product obtained on melt kneading a composition comprising: about 10 to about 35 weight percent of a poly(arylene ether); about 15 to about 40 weight percent of a polyolefin; about 10 to about 35 weight percent of an acid-functionalized hydrogenated block copolymer of an alkenyl aromatic compound and a conjugated diene; wherein the acid-functionalized hydrogenated block copolymer has a poly(alkenyl aromatic) content of at least 15 weight percent, based on the total weight of the acid-functionalized hydrogenated block copolymer; and about 0.01 to about 5 weight percent of a polyamine compound; wherein all weight percents are based on the total weight of the composition unless a different weight basis is specified; wherein the composition has a ribbon tensile strength of at least 15 megapascals measured at 23° C. according to JIS K6251; wherein the composition retains at least 40 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790.

Another embodiment is a composition consisting of the reaction product obtained on melt kneading a composition consisting of: about 10 to about 35 weight percent of a poly (arylene ether); about 15 to about 40 weight percent of a polyolefin; about 10 to about 35 weight percent of an acid-functionalized hydrogenated block copolymer of an alkenyl aromatic compound and a conjugated diene; wherein the acid-functionalized hydrogenated block copolymer has a poly(alkenyl aromatic) content of at least 15 weight percent, based on the total weight of the acid-functionalized hydrogenated block copolymer; about 0.01 to about 5 weight percent of a polyamine compound; optionally, up to 10 weight percent of an unfunctionalized hydrogenated block copolymer of an alkenyl aromatic compound and a conjugated diene; optionally, up to 5 weight percent of an unhydrogenated block copolymer of an alkenyl aromatic compound and a conjugated diene; and optionally, an additive selected from the group consisting of stabilizers, mold release agents, processing aids, flame retardants, drip retardants, nucleating agents, UV blockers, dyes, pigments, antioxidants, anti-static agents, blowing agents, mineral oil, metal deactivators, antiblocking agents, nanoclays, and combinations thereof; wherein all weight percents are based on the total weight of the composition, unless a different weight basis is specified; wherein the composition has a ribbon tensile strength of at least 15 megapascals measured at 23° C. according to JIS K6251; wherein the composition retains at least 40 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790.

Another embodiment is a composition comprising the reaction product obtained on melt kneading a composition, comprising: about 15 to about 35 weight percent of a poly(2,6-dimethyl-1,4-phenylene ether) having an intrinsic viscosity of about 0.3 to about 0.6 deciliter per gram, measured at 25° C. in chloroform; about 20 to about 35 weight percent of a polyolefin selected from the group consisting of polypropylene, high density polyethylene, and combinations thereof; about 10 to about 30 weight percent of an acid-functionalized hydrogenated block copolymer that is a maleic anhydride-grafted polystyrene-poly(ethylene-butylene)-polystyrene triblock copolymer; wherein the acid-functionalized hydrogenated block copolymer has a weight average molecular weight of 200,000 to about 400,000 atomic mass units and a polystyrene content of about 25 to about 35 weight percent based on the total weight of the acid-functionalized hydrogenated block copolymer; about 1 to about 8 weight percent of an unfunctionalized polystyrene-poly(ethylene/butylene)-polystyrene triblock copolymer; about 0.01 to about 5 weight percent of a polyethyleneimine having a number average molecular weight of about 100 to about 1,000,000 atomic mass units; about 1 to about 10 weight percent of melamine polyphosphate; about 2 to about 10 weight percent of magnesium hydroxide; and about 5 to about 20 weight percent of a triaryl phosphate flame retardant; wherein all weight percents are based on the total weight of the composition unless a different weight basis is specified; wherein the composition has a ribbon tensile strength of at least 15 megapascals measured at 23° C. according to JIS K6251; wherein the composition retains at least 60 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790.

Another embodiment is a composition consisting of the reaction product obtained on melt kneading a composition, consisting of: about 15 to about 35 weight percent of a poly (2,6-dimethyl-1,4-phenylene ether) having an intrinsic viscosity of about 0.3 to about 0.6 deciliter per gram, measured at 25° C. in chloroform; about 20 to about 35 weight percent of a polyolefin selected from the group consisting of polypropylene, high density polyethylene, and combinations thereof; about 10 to about 30 weight percent of an acid-functionalized hydrogenated block copolymer that is a maleic anhydride-grafted polystyrene-poly(ethylene-butylene)-polystyrene triblock copolymer; wherein the acid-functionalized hydrogenated block copolymer has a weight average molecular weight of 200,000 to about 400,000 atomic mass units and a polystyrene content of about 25 to about 35 weight percent based on the total weight of the acid-functionalized hydrogenated block copolymer about 1 to about 8 weight percent of an unfunctionalized polystyrene-poly(ethylene/butylene)-polystyrene triblock copolymer; about 0.01 to about 5 weight percent of a polyethyleneimine having a number average molecular weight of about 100 to about 1,000,000 atomic mass units; optionally, up to 5 weight percent of an unhydrogenated block copolymer of an alkenyl aromatic compound and a conjugated diene; optionally, an additive selected from the group consisting of stabilizers, mold release agents, processing aids, flame retardants, drip retardants, nucleating agents, UV blockers, dyes, pigments, antioxidants, anti-static agents, blowing agents, mineral oil, metal deactivators, antiblocking agents, nanoclays, and combinations thereof; about 1 to about 10 weight percent of melamine polyphosphate; about 2 to about 10 weight percent of magnesium hydroxide; and about 5 to about 20 weight percent of a triaryl phosphate flame retardant; wherein all weight percents are based on the total weight of the composition, unless a different weight basis is specified; wherein the composition has a ribbon tensile strength of at least 15 megapascals measured at 23° C. according to JIS K6251; wherein the composition retains at least 60 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790.

Another embodiment is a composition comprising the reaction product obtained on melt kneading a composition, comprising: about 18 to about 25 weight percent of a poly(2,6-dimethyl-1,4-phenylene ether) having an intrinsic viscosity of about 0.3 to about 0.6 deciliter per gram, measured at 25° C. in chloroform; about 20 to about 30 weight percent of a polyolefin selected from the group consisting of polypropylene, high density polyethylene, and combinations thereof; about 15 to about 25 weight percent of an acid-functionalized hydrogenated block copolymer that is a maleic anhydride-grafted polystyrene-poly(ethylene-butylene)-polystyrene triblock copolymer; wherein the acid-functionalized hydrogenated block copolymer has a weight average molecular weight of 200,000 to about 400,000 atomic mass units and a polystyrene content of about 25 to about 35 weight percent based on the total weight of the acid-functionalized hydrogenated block copolymer; about 1 to about 8 weight percent of an unfunctionalized polystyrene-poly(ethylene/butylene)-polystyrene triblock copolymer; about 0.01 to about 5 weight percent of a polyethyleneimine having a number average molecular weight of about 100 to about 1,000,000 atomic mass units; about 1 to about 10 weight percent of melamine polyphosphate; about 2 to about 10 weight percent of magnesium hydroxide; and about 5 to about 20 weight percent of a triaryl phosphate flame retardant; wherein all weight percents are based on the total weight of the composition, unless a different weight basis is specified; wherein the composition has a ribbon tensile strength of at least 15 megapascals measured at 23° C. according to JIS K6251; wherein the composition retains at least 60 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790.

Another embodiment is a method of preparing a thermoplastic composition, comprising: melt kneading about 10 to about 35 weight percent of a poly(arylene ether); about 15 to about 40 weight percent of a polyolefin; about 10 to about 35 weight percent of an acid-functionalized hydrogenated block copolymer of an alkenyl aromatic compound and a conjugated diene; wherein the acid-functionalized hydrogenated block copolymer has a poly(alkenyl aromatic) content of at least 15 weight percent, based on the total weight of the acid-functionalized hydrogenated block copolymer; and about 0.01 to about 5 weight percent of a polyamine compound; wherein all weight percents are based on the total weight of the composition, unless a different weight basis is specified; wherein the composition has a ribbon tensile strength of at least 15 megapascals measured at 23° C. according to JIS K6251; wherein the composition retains at least 40 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790.

Another embodiment is a method of preparing a thermoplastic composition, comprising: melt kneading about 15 to about 35 weight percent of a poly(2,6-dimethyl-1,4-phenylene ether) having an intrinsic viscosity of about 0.3 to about 0.6 deciliter per gram, measured at 25° C. in chloroform; about 20 to about 35 weight percent of a polyolefin selected from the group consisting of polypropylene, high density polyethylene, and combinations thereof; about 10 to about 30 weight percent of an acid-functionalized hydrogenated block copolymer that is a maleic anhydride-grafted polystyrene-poly(ethylene-butylene)-polystyrene triblock copolymer; wherein the acid-functionalized hydrogenated block copolymer has a weight average molecular weight of 200,000 to about 400,000 atomic mass units and a polystyrene content of about 25 to about 35 weight percent based on the total weight of the acid-functionalized hydrogenated block copolymer; about 1 to about 8 weight percent of an unfunctionalized polystyrene-poly(ethylene/butylene)-polystyrene triblock copolymer; about 0.01 to about 5 weight percent of a polyethyleneimine having a number average molecular weight of about 100 to about 1,000,000 atomic mass units; about 1 to about 10 weight percent of melamine polyphosphate; about 2 to about 10 weight percent of magnesium hydroxide; and about 5 to about 20 weight percent of a triaryl phosphate flame retardant to form a blend; wherein all weight percents are based on the total weight of the composition, unless a different weight basis is specified; and melt filtering the blend through a filter comprising openings with diameters of about 20 micrometers to about 150 micrometers; wherein the composition has a ribbon tensile strength of at least 15 megapascals measured at 23° C. according to JIS K6251; wherein the composition retains 46.9 to 77.1 percent of its ribbon tensile strength after 20 hours immersion in a 50:50 weight/weight mixture of kerosene and SAE 10W30 motor oil at 50° C.; and wherein the composition has a flexural modulus of 425 to 900 megapascals measured at 23° C. according to ASTM D790.

Other embodiments are described in detail below, including articles comprising the compositions above, and in particular tubes for sheathing automotive wiring harnesses comprising the compositions above.

BRIEF DESCRIPTION OF THE DRAWING

The FIGURE includes transmission electron micrographs at two magnifications for a sample corresponding to Example 8.

DETAILED DESCRIPTION OF THE INVENTION

The present inventors have conducted experiments in search of halogen-free thermoplastic compositions suitable as a replacement for polyvinyl chloride in its use for automotive components in general and tubes for sheathing automotive wiring harnesses in particular. Initial blends of poly (arylene ether)s, polyolefins, and hydrogenated block copolymers exhibited many of the desired properties but were deficient in their chemical resistance. Specifically, tensile strength degraded rapidly on exposure to a 50:50 weight/ weight mixture of kerosene and motor oil. Further experimentation revealed that substantial and unexpected improvements in chemical resistance could be achieved by using the combination of an acid-functionalized hydrogenated block copolymer and a polyamine compound. These results were unexpected because it has not previously been possible to achieve the combination of flexibility, good tensile strength, and good retention of tensile strength after chemical exposure. In particular, it has been very difficult to improve chemical resistance. Property retention after chemical immersion gives a measure of the material's ability to retain its mechanical integrity when exposed to different chemicals. It indicates the rate at which a property decays as it is exposed to a chemical. The automotive industry regards strength retention a better measure of a material's resistance to chemicals than the absolute strength after immersion. To measure the chemical resistance of a material, it is immersed in the chemical for a fixed period of time. However, in real applications the material may be exposed to the chemical for shorter or longer duration. The strength retention, and not the final strength, after chemical exposure gives an indication of which material is more robust to chemical exposure because it accounts for the rate at which the strength is decreasing.

One embodiment is a composition comprising the reaction product obtained on melt kneading a composition comprising: about 10 to about 35 weight percent of a poly(arylene ether); about 15 to about 40 weight percent of a polyolefin; about 10 to about 35 weight percent of an acid-functionalized hydrogenated block copolymer of an alkenyl aromatic compound and a conjugated diene; wherein the acid-functionalized hydrogenated block copolymer has a poly(alkenyl aromatic) content of at least 15 weight percent, based on the total weight of the acid-functionalized hydrogenated block copolymer; and about 0.01 to about 5 weight percent of a polyamine compound; wherein all weight percents are based on the total weight of the composition unless a different weight basis is specified; wherein the composition has a ribbon tensile strength of at least 15 megapascals measured at 23° C. according to JIS K6251; wherein the composition retains at least 40 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790. As demonstrated in the working examples, use of an acid-functionalized hydrogenated block copolymer in combination with a polyamine compound significantly improves the chemical resistance of the blend compared to corresponding blends without the polyamine compound. In some embodiments, the composition retains 40 to 77.1 percent of its ribbon tensile strength after 20 hours immersion in a 50:50 weight/ weight mixture of kerosene and SAE 10W30 motor oil at 50° C. Within this range, the tensile strength retention may be at least about 50%, or at least about 60%, or at least about 65%. In some embodiments, the composition has a ribbon tensile strength (that is, an initial tensile strength) of 15 to 37.1 megapascals. In some embodiments, the composition has a flexural modulus of 425 to 900 megapascals measured at 23° C. according to ASTM D790. Within this range, the flexural modulus may be up to about 600 megapascals, or up to about 550 megapascals, or up to about 500 megapascals.

The composition comprises a poly(arylene ether). In one embodiment, the poly(arylene ether) comprises repeating structural units having the formula

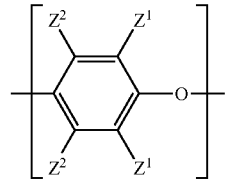

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio (that is, ($C_1$-$C_{12}$ hydrocarbyl)S—), $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties.

In some embodiments, the poly(arylene ether) comprises 2,6-dimethyl-1,4-phenylene ether units, 2,3,6-trimethyl-1,4-phenylene ether units, or a combination thereof.

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

The poly(arylene ether) can have a number average molecular weight of 3,000 to 40,000 atomic mass units (AMU) and a weight average molecular weight of 5,000 to 80,000 AMU, as determined by gel permeation chromatography using monodisperse polystyrene standards, a styrene divinyl benzene gel at 40° C. and samples having a concentration of 1 milligram per milliliter of chloroform. (It should be noted that all molecular weight values recited herein are uncorrected values as determined by gel permeation chromatography using polystyrene standards.) The poly(arylene ether) can have an intrinsic viscosity of about 0.05 to about 1.0 deciliter per gram (dL/g), as measured in chloroform at 25° C. Those skilled in the art understand that intrinsic viscosity of a poly(arylene ether) can increase by up to 30% on melt kneading. The above intrinsic viscosity range of 0.05 to about 1.0 deciliter per gram is intended to encompass intrinsic viscosities both before and after melt kneading to form the composition. Within the above range, the intrinsic viscosity can be at least about 0.1 dL/g, or at least about 0.2 dL/g, or at least about 0.3 dL/g. Also within the above range, the intrinsic viscosity can be up to about 0.8 dL/g, or up to about 0.6 dL/g. A blend of poly(arylene ether) resins having different intrinsic viscosities can be used.

The composition comprises about 10 to about 35 weight percent of the poly(arylene ether), based on the total weight of the composition. In some embodiments, the poly(arylene ether) amount is about 15 to about 30 weight percent, specifically about 18 to about 25 weight percent.

In addition to the poly(arylene ether), the composition comprises a polyolefin. Polyolefins are of the general structure $C_nH_{2n}$ and include polyethylene, polypropylene, and polyisobutylene, with exemplary homopolymers being linear low density polyethylene, atactic polypropylene, and isotatic polypropylene. Polyolefin resins of this general structure are commercially available, and methods for their preparation are known in the art. In some embodiments, the polyolefin is a homopolymer selected from polypropylene, high density polyethylene, and combinations thereof.

Copolymers of polyolefins can also be used, including copolymers of polypropylene with rubber homopolymers or copolymers or copolymers of polyethylene with rubber homopolymers or copolymers. The copolymer can include copolymers such as ethylene-octene rubber and ethylene-butadiene rubber, for example. Such copolymers are typically heterophasic and have sufficiently long sections of each component to have both amorphous and crystalline phases. Additionally the polyolefin can comprise a combination of homopolymer and copolymer, a combination of homopolymers having different melt temperatures, and/or a combination of homopolymers having a different melt flow rate.

In one embodiment the polyolefin comprises a crystalline polyolefin such as isotactic polypropylene. Crystalline polyolefins are defined as polyolefins having a crystallinity content greater than or equal to 20%, specifically greater than or equal to 25%, more specifically greater than or equal to 30%. Percent crystallinity can be determined by differential scanning calorimetry (DSC). In some embodiments, the polyolefin comprises a high density polyethylene. The high density polyethylene can have a density of 0.941 to 0.965 grams per milliliter.

In some embodiments, the polyolefin comprises a polypropylene having a melt temperature greater than or equal to 120° C., specifically greater than or equal to 125° C., more specifically greater than or equal to 130° C., even more specifically, greater than or equal to 135° C. In some embodiments, the polypropylene has a melt temperature less than or equal to 175° C. In some embodiments, the polyolefin comprises a high density polyethylene having a melting temperature of greater than or equal to 124° C., specifically greater than or equal to 126° C., more specifically greater than or equal to 128° C. In some embodiments, the melting temperature of the high density polyethylene is less than or equal to 140° C.

In some embodiments, the polyolefin has a melt flow rate (MFR) of about 0.3 to about 10 grams per ten minutes (g/10 min). Specifically, the melt flow rate can be about 0.3 to about 5 g/10 min. Melt flow rate can be determined according to ASTM D1238 using either powdered or pelletized polyolefin, a load of 2.16 kilograms and a temperature suitable for the resin (190° C. for ethylene based resins and 230° C. for propylene based resins).

The composition can comprise the polyolefin in an amount of about 15 to about 40 weight percent, based on the total weight of the composition. Specifically, the polyolefin amount can be about 15 to about 35 weight percent, more specifically about 20 to about 30 weight percent.

In addition to the poly(arylene ether) and the polyolefin, the composition comprises an acid-functionalized hydrogenated block copolymer of an alkenyl aromatic compound and a conjugated diene.

The alkenyl aromatic monomer used to prepare the acid-functionalized hydrogenated block copolymer can have the structure

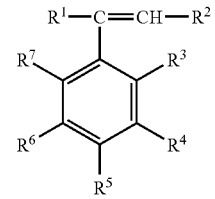

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ allyl group, a chlorine atom, or a bromine atom; and $R^4$—$R^6$ each independently represent a hydrogen atom, a $C_1$-$C_8$ alkyl group, or a $C_2$-$C_8$ alkenyl group; or $R^3$ and $R^4$ are taken together with the central aromatic ring to form a naphthyl group, or $R^4$ and $R^5$ are taken together with the central aromatic ring to form a naphthyl group. Specific alkenyl aromatic monomers include, for example, styrene, chlorostyrenes such as p-chlorostyrene, and methylstyrenes such as alpha-methylstyrene and p-methylstyrene. In one embodiment, the alkenyl aromatic monomer is styrene. The acid-functionalized hydrogenated block copolymer can have a poly(alkenyl aromatic) content of about 10 to about 90 percent, based on the total weight of the acid-functionalized hydrogenated block copolymer. In some embodiments, the poly(alkenyl aromatic) is about 10 to 45 weight percent, specifically 20 to about 40 weight percent, more specifically about 25 to about 35 weight percent. In other embodiments, the poly(alkenyl aromatic) is greater than 45 weight percent to about 90 weight percent, specifically about 50 to about 80 weight percent, more specifically about 60 to about 75 weight percent.

The conjugated diene used to prepare the acid-functionalized hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene. The acid-functionalized hydrogenated block copolymer can have a poly(conjugated diene) content of about 10 to about 90 percent, based on the total weight of the acid-functionalized hydrogenated block copolymer. In some embodiments, the poly(alkenyl aromatic) is 55 to about 90 weight percent, specifically about 60 to about 80 weight percent, more specifically about 65 to about 75 weight percent. In other embodiments, the poly(alkenyl aromatic) is about 10 to less than 55 weight percent, specifically about 20 to about 30 weight percent, more specifically about 25 to about 40 weight percent.

The acid-functionalized hydrogenated block copolymer is a copolymer comprising (A) at least one block derived from an alkenyl aromatic compound and (B) at least one block derived from a conjugated diene, in which the aliphatic unsaturated group content in the block (B) is reduced by hydrogenation, and further comprising residues derived from an acid functionalizing agent. The arrangement of blocks (A) and (B) includes a linear structure, a grafted structure, and a radial teleblock structure with or without a branched chain. Linear block copolymers include tapered linear structures and non-tapered linear structures. In some embodiments, the acid-functionalized hydrogenated block copolymer has a non-tapered linear structure. In some embodiments, the acid-functionalized hydrogenated block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from the other A blocks, and wherein the molecular weight of each B block may be the same as or different from the other B blocks. In some embodiments, the acid-functionalized hydrogenated block copolymer is a diblock copolymer, a triblock copolymer, or a combination thereof.

Acid-functionalized hydrogenated block copolymers with a wide range of weight average molecular weights are suitable. For example, the acid-functionalized hydrogenated block copolymer may have a weight average molecular weight greater than or equal to 50,000, specifically greater than or equal to 200,000. In some embodiments, the acid-functionalized hydrogenated block copolymer has a weight average molecular weight of about 50,000 to about 500,000 atomic mass units. In some embodiments, the weight average molecular weight is about 50,000 to less than 200,000 atomic mass units, specifically about 60,000 to about 190,000 atomic mass units. In other embodiments, the weight average molecular weight is 200,000 to about 500,000 atomic mass units, specifically about 220,000 to about 400,000 atomic mass units, more specifically about 220,000 to about 350,000 atomic mass units.

The acid-functionalized hydrogenated block copolymer can be prepared by graft-reacting an acid moiety or its derivative onto the hydrogenated block copolymer via a free radically initiated reaction. Suitable monomers (acid-functionalizing agents) that can be grafted include unsaturated mono- and polycarboxylic acids and anhydrides containing from about 3 to about 20 carbon atoms. Examples of such monomers are maleic acid, maleic anhydride, methyl maleic acid, methyl maleic anhydride, dimethyl maleic acid, dimethyl maleic anhydride, monochloro maleic acid, monochloro maleic anhydride, dichloro maleic acid, dichloro maleic anhydride, 5-norbornene-2,3-dicarboxylic acids, 5-norbornene-2,3-dicarboxylic acid anhydrides, tetrahydrophthalic acids, tetrahydrophthalic anhydrides, fumaric acid, itaconic acid, itaconic anhydride, citraconic acid, citraconic anhydride, trimellitic acid, trimellitic acid anhydride, trimellitic anhydride acid chloride, and mixtures thereof. In one embodiment, the grafting monomer is maleic anhydride. The acid-functionalized hydrogenated block copolymer can comprise about 0.1 to about 10 weight percent of the grafted monomer, specifically about 0.2 to about 5 weight percent of the grafted monomer.

The grafting reaction can be carried out in solution or by melt-mixing the base block copolymer and the acid/anhydride monomer in the presence of a free radical initiator. Solution processes are described, for example, in U.S. Pat. Nos. 4,033,888 and 4,077,893 to Kiovsky, and U.S. Pat. No. 4,670,173 to Hayashi et al. Melt-mixing processes are described, for example, in U.S. Pat. No. 4,427,828 to Hergenrother et al., U.S. Pat. No. 4,578,429 to Gergen et al., and U.S. Pat. Nos. 4,628,072 and 4,657,971 to Shiraki et al. Acid-functionalized hydrogenated block copolymers are also commercially available as, for example, the maleic anhydride-grafted polystyrene-poly(ethylene/butylene)-polystyrene block copolymer having a styrene content of 33 weight percent, a bound maleic anhydride content of 1.0 weight percent, and a weight average molecular weight of 288,960 AMU sold as KRATON MD6684 CS by KRATON Polymers.

In some embodiments, the acid-functionalized hydrogenated block copolymer is a maleic anhydride-functionalized linear block copolymer or radial teleblock copolymer of styrene and a conjugated diene selected from the group consisting of butadiene, isoprene, and combinations thereof, wherein acid-functionalized hydrogenated block copolymer has a styrene content of about 10 to about 50 weight percent.

In some embodiments, the acid-functionalized hydrogenated block copolymer is a maleic anhydride-functionalized polystyrene-poly(ethylene-butylene)-polystyrene triblock copolymer having a styrene content of about 10 to about 50 weight percent. In some embodiments, the acid-functionalized hydrogenated block copolymer is a maleic anhydride-functionalized polystyrene-poly(ethylene-propylene) diblock copolymer.

In some embodiments, the acid-functionalized hydrogenated block copolymer excludes the residue of monomers and functionalizing agents other than the alkenyl aromatic compound, the conjugated diene, and an acid-functionalizing agent. In other words, the hydrogenated acid-functionalized hydrogenated block copolymer consists of units derived from the alkenyl aromatic compound, the conjugated diene, and the acid-functionalizing agent.

The composition comprises the acid-functionalized hydrogenated block copolymer in an amount of about 10 to about 35 weight percent, based on the total weight of the composition. Specifically, the composition can comprise the acid-functionalized hydrogenated block copolymer in an amount of about 10 to about 30 weight percent, more specifically about 12 to about 30 weight percent, even more specifically about 15 to about 25 weight percent.

In addition to the poly(arylene ether), the polyolefin, and the acid-functionalized hydrogenated block copolymer, the composition comprises a polyamine compound. A polyamine compound is a compound that comprises at least three amine groups that can be primary amine groups, secondary amine groups, or a combination thereof. In some embodiments, the polyamine compound can comprise, in addition to the at least three amine groups, alkylene groups that can optionally be substituted with catenary (in-chain) ether oxygen atoms. While not wishing to be bound by any particular theory, the present inventors speculate that the polyamine compound can function as a crosslinking agent for the acid-functionalized hydrogenated block copolymer, thereby allowing the formation of a crosslinked elastomer. In some embodiments, the polyamine compound comprises (a) at least three amine groups selected from the group consisting of primary amine groups, secondary amine groups, and combinations thereof, and (b) at least one $C_2$-$C_6$ alkylene group optionally substituted with one or more ether oxygen atoms. In some embodiments, the polyamine compound is free of carbonyl groups; in this embodiment, the polyamine is defined to exclude polyamides, polyamideimides, polyimides, and other carbonyl-containing compounds. In some embodiments, the polyamine can comprise at least four amine groups, or at least five amine groups, or at least six amine groups, or at least seven amine groups. In some embodiments, the polyamine compound consists of carbon, hydrogen, and nitrogen atoms. In some embodiments, the polyamine compound is substantially free of aliphatic and aromatic unsaturation.

In some embodiments, the polyamine compound has a boiling point of at least about 120° C., more specifically at least about 150° C., still more specifically at least about 180° C. Such a boiling point facilitates efficient melt-kneading of the composition by reducing the amount of polyamine compound that is lost via volatilization before reacting with the acid-functionalized block copolymer.

In some embodiments, the polyamine compound is chosen from polyetheramines, polyalkyleneimines, polyalkyleneamines, and mixtures thereof.

The polyamine compound can be a polyetheramine. Polyetheramines are oligomeric or polymeric molecules comprising repeating alkylene ether units and at least two primary amine termini. Suitable polyetheramines include those having the structure

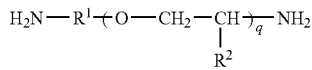

wherein $R^1$ is $C_2$-$C_{12}$ hydrocarbylene, more specifically $C_2$-$C_6$ alkylene, still more specifically —$CH_2CH_2$— or —$CH(CH_3)CH_2$—; each occurrence of $R^2$ is independently hydrogen or methyl; and q is 1 to about 100. Commercially available examples of such polyetheramines include XTJ-505, XTJ-506, XTJ-507, JEFFAMINE® M-2070, JEFFAMINE® D-230, JEFFAMINE® D-400, JEFFAMINE® D-2000, XTJ-500, XTJ-501, XTJ-502, XTJ-510, and JEFFAMINE® EDR-148, all from Huntsman. Suitable polyetheramines further include those having the structure

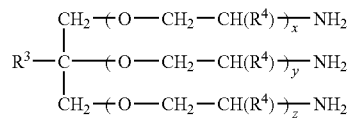

wherein $R^3$ is hydrogen or $C_1$-$C_{12}$ hydrocarbyl, more specifically $C_1$-$C_6$ alkyl; each occurrence of $R^4$ is independently hydrogen or methyl; and x and y and z are each independently 1 to about 100. Commercially available examples of such polyetheramines include JEFFAMINE® T-403, JEFFAMINE® T-5000, and XTJ-509, all from Huntsman.

The polyamine compound can be a polyallyleneimine. Polyalkyleneimines can be prepared by polymerizing an alkylene imine (e.g., ethyleneimine, also known as aziridine) in the presence of a catalyst such as carbon dioxide, sodium bisulfite, sulfuric acid, hydrogen peroxide, hydrochloric acid, acetic acid, or the like. Specific methods for preparing polyalkyleneimines are described, for example, in U.S. Pat. No. 2,182,306 to Ulrich et al., U.S. Pat. No. 3,033,746 to Mayle et al., U.S. Pat. No. 2,208,095 to Esselmann et al., U.S. Pat. No. 2,806,839 to Crowther, and U.S. Pat. No. 2,553,696 to Wilson. In addition to linear and branched polyalkyleneimines, the present invention also includes the cyclic amines that are typically formed as by-products of known synthetic methods. The presence of these materials can be increased or decreased depending on the reaction conditions. Suitable polyalkyleneimines are commercially available as, for example, the polyethyleneimines EPOMIN® SP-003 (about 300 atomic mass units), EPOMIN® SP-006 (about 600 atomic mass units), EPOMIN® SP-012 (about 1200 atomic mass units), EPOMIN® SP-18 (about 1800 atomic mass units), EPOMIN® SP-200 (about 10,000 atomic mass units), EPOMIN® P-1000 (about 70,000 atomic mass units), and EPOMIN® P-1050 (about 70,000 atomic mass units), all from Nippon Shokubai. Commercially available polyalkyleneimines further include the polyethyleneimines LUPASOL FG (about 800 atomic mass units), LUPASOL G20 (about 1,300 atomic mass units), and LUPASOL G35 (about 2,000 atomic mass units), all from BASF.

The polyamine compound can be a polyalkyleneamine. Polyalkyleneamines can be prepared by the reaction of an alkylene dichloride (e.g., ethylene-1,2-dichloride) with ammonia, followed by fractional distillation. Examples of polyalkyleneamines are triethylene tetraamine, tetraethylenepentamine, and tetrabutylenepentamine, as well as the corresponding hexamines, heptamines, octamines, and nonamines. These compound or mixtures of compound can further comprise small amounts of reaction by-products, including cyclic amines, particularly piperazines, and cyclic amines with nitrogen-containing side chains. Mixtures of different polyalkyleneamines can be used. Preparation of polyalkyleneamines is described, for example, in U.S. Pat. No. 2,792,372 to Dickson.

In some embodiments, the polyamine compound can have a number average molecular weight of about 100 to about 1,000,000 atomic mass units, specifically about 200 to about 500,000 atomic mass units, more specifically about 300 to about 100,000 atomic mass units, even more specifically about 300 to about 10,000 atomic mass units, yet more specifically about 300 to about 2,000 atomic mass units.

The composition can comprise about 0.01 to about 5 weight percent of the polyamine compound, based on the total weight of the composition. Specifically, the polyamine compound amount can be about 0.2 to about 3 weight percent, more specifically about 0.2 to about 2 weight percent, even more specifically about 0.2 to about 1 weight percent. In some embodiments, the total amount of the poly(arylene ether) and the acid-functionalized hydrogenated block copolymer is at least 60 weight percent, specifically at least 65 weight percent.

In addition to the poly(arylene ether), the polyolefin, the acid-functionalized hydrogenated block copolymer, and the polyamine compound, the composition may, optionally, further comprise an unfunctionalized hydrogenated block copolymer of an alkenyl aromatic compound and a conjugated diene. Unlike the acid-functionalized hydrogenated block copolymer, the unfunctionalized hydrogenated block copolymer does not comprise the residue of an acid functionalizing agent. In other respects and to the extent that it does not conflict with the description that follows, the description of the acid-functionalized hydrogenated block copolymer applies to the unfunctionalized hydrogenated block copolymer.

The unfunctionalized hydrogenated block copolymer can have a poly(alkenyl aromatic) content of about 10 to about 90 weight percent, based on the total weight of the hydrogenated block copolymer. In some embodiments, the poly(alkenyl aromatic) content can be about 10 to 45 weight percent, specifically about 20 to about 35 weight percent, more specifically about 25 to about 35 weight percent. In other embodiments, the poly(alkenyl aromatic) content can be greater than 45 weight percent and less than or equal to 90 weight percent, more specifically about 50 to about 80 weight percent, still more specifically about 60 to about 75 weight percent.

The unfunctionalized hydrogenated block copolymer can have a weight average molecular weight of about 40,000 to about 500,000 atomic mass units. In some embodiments, the unfunctionalized hydrogenated block copolymer can have a weight average molecular weight of about 400,000 to less than 200,000 atomic mass units, specifically about 60,000 to about 190,000 atomic mass units, more specifically about 60,000 to about 150,000 atomic mass units. In other embodiments, the unfunctionalized hydrogenated block copolymer can have a weight average molecular weight of 200,000 to about 500,000 atomic mass units, specifically 220,000 to about 350,000 atomic mass units.

The arrangement of blocks (A) and (B) in the unfunctionalized hydrogenated block copolymer includes a linear structure, a grafted structure, and a radial teleblock structure with or without a branched chain. Linear block copolymers include tapered linear structures and non-tapered linear structures. In some embodiments, the acid-functionalized hydrogenated block copolymer has a tapered linear structure. Method of preparing tapered block copolymers, which may also be referred to as controlled distribution block copolymers, are described, for example, in U.S. Patent Application No. US 2003/181584 A1 of Handlin et al. Suitable tapered block copolymers are also commercially available as, for example, KRATON A-RP6936 and KRATON A-RP6935 from Kraton Polymers. In some embodiments, the unfunctionalized hydrogenated block copolymer is a polystyrene-poly(ethylene-butylene) diblock copolymer, a polystyrene-poly(ethylene-butylene)-polystyrene triblock copolymer, or a mixture thereof. In some embodiments, the unfunctionalized hydrogenated block copolymer is a polystyrene-poly(ethylene-propylene) diblock copolymer. These block copolymers do not include the residue of any functionalizing agents or any monomers other than those indicated by their names. In some embodiments, the unfunctionalized hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

Methods of preparing unfunctionalized hydrogenated block copolymers are known in the art and described, for example, in U.S. Pat. No. 3,431,323 to Jones. Such copolymers are also commercially available as, for example, the polystyrene-poly(ethylene/butylene)-polystyrene triblock copolymer having a styrene content of 30 weight percent and a weight average molecular weight of 117,000 atomic mass units sold as KRATON G 1650 by Kraton Polymers, the polystyrene-poly(ethylene/butylene)-polystyrene triblock copolymer having a styrene content of 31 weight percent based and a weight average molecular weight of about 240,000 to about 301,000 atomic mass units (AMU) available from Kraton Polymers as KRATON G 1651, and the polystyrene-poly(ethylene/butylene)-polystyrene triblock copolymer having a styrene content of 67 weight percent and a weight average molecular weight of about 40,000 to 56,000 atomic mass units sold as TUFTEC H1043 by Asahi Chemical.

When present, the unfunctionalized hydrogenated block copolymer can be used in an amount of about 1 to about 10 weight percent based on the total weight of the composition, specifically about 2 to about 8 weight percent, more specifically about 5 to about 7 weight percent. In some embodiments, the composition is substantially free of the unfunctionalized hydrogenated block copolymer. In these embodiments, "substantially free" means that none of the unfunctionalized hydrogenated block copolymer is intentionally added to the composition. The composition can be "substantially free" of unfunctionalized hydrogenated block copolymer even though it can contain a very small amount of unfunctionalized hydrogenated block copolymer which is present as an impurity in the acid-functionalized hydrogenated block copolymer.

In some embodiments, the composition is substantially free of an unfunctionalized hydrogenated block copolymer of an alkenyl aromatic compound and a conjugated diene, wherein the unfunctionalized block copolymer has a poly(alkenyl aromatic) content greater than 45 weight percent and less than or equal to 90 weight percent, based on the total weight of the unfunctionalized hydrogenated block copolymer. In some embodiments, the composition is substantially free of an unfunctionalized hydrogenated block copolymer of an alkenyl aromatic compound and a conjugated diene, wherein the unfunctionalized hydrogenated block copolymer has a weight average molecular weight greater than or equal to 200,000 atomic mass units. In some embodiments, the composition is substantially free of an unfunctionalized hydrogenated block copolymer of an alkenyl aromatic compound and a conjugated diene, wherein the unfunctionalized hydrogenated block copolymer has a weight average molecular weight of about 40,000 to less than 200,000 atomic mass units. The composition can be substantially free of an unfunctionalized block copolymer having a weight average molecular weight of about 40,000 to less than 200,000 atomic mass units even though an unfunctionalized hydrogenated triblock copolymer having a weight average molecular weight greater than or equal to 200,000 atomic mass units is used, and that unfunctionalized hydrogenated triblock copolymer includes up to 1 weight percent of a diblock impurity having a weight average molecular weight less than 200,000 atomic mass units.

The composition may, optionally, further comprise an unhydrogenated block copolymer of an alkenyl aromatic compound and a conjugated diene. The unhydrogenated block copolymer differs from the various hydrogenated block copolymers described above in that the aliphatic unsaturated group content in the poly(conjugated diene) blocks (B) have not been reduced by hydrogenation. The unhydrogenated block copolymer can comprise an poly(alkenyl aromatic) content of about 10 to about 90 weight percent, specifically about 20 to about 80 weight percent, more specifically about 25 to about 40 weight percent. There is no particular limit on the weight average molecular weight of the unhydrogenated block copolymer. The unhydrogenated block copolymer may be a diblock copolymer, a linear triblock copolymer, a linear polyblock copolymer, a radial copolymer, or a mixture thereof. The individual blocks of the unhydrogenated block copolymer may be homopolymers, tapered copolymers, or random copolymers. Methods of preparing unhydrogenated block copolymers are known in the art. Suitable unhydrogenated block copolymers are also commercially available as, for example, the KRATON® D series polymers, including KRATON® D1101 and D1102, from Kraton Polymers, and the styrene-butadiene radial teleblock copolymers available as, for example, K-RESIN KR01, KR03, KR05, and KR10 sold by Chevron Phillips Chemical Company. When present, the unhydrogenated block copolymer can be used in an amount of about 1 to about 10 weight percent based on the total weight of the composition, specifically about 2 to about 5 weight percent. In some embodiments, the composition is substantially free of the unhydrogenated block copolymer. In these embodiments, "substantially free" means that no unhydrogenated block copolymer is intentionally added.

The composition may, optionally, further comprise various additives known in the thermoplastics art. For example, the composition may, optionally, further comprise an additive chosen from stabilizers, mold release agents, processing aids, flame retardants, drip retardants, nucleating agents, UV blockers, dyes, pigments, antioxidants, anti-static agents, blowing agents, mineral oil, metal deactivators, antiblocking agents, nanoclays, and the like, and combinations thereof. Additives can be added in amounts that do not unacceptably detract from the desired optical and physical properties of the composition. Such amounts can be determined by a skilled artisan without undue experimentation. Flame retardants described herein as "triaryl phosphate flame retardants" include compounds with at least one triaryl phosphate moiety. The triaryl phosphate flame retardant can include more than one triaryl phosphate moiety. Examples of triaryl phosphate flame retardants include triphenyl phosphate, tricresyl phosphate, resorcinol bis(diphenyl phosphate), bisphenol A bis(diphenyl phosphate), and the like, and combinations thereof.

In some embodiments, the composition can exclude or be substantially free of components other than those described above. For example, the composition can be substantially free of other polymeric materials, such as homopolystyrenes (including atactic, isotactic, and syndiotactic polystyrenes), polyamides, polyesters, polycarbonates, ethylene/alpha-olefin copolymers, and polypropylene-graft-polystyrenes. In this context, the term "substantially free" means that none of the specified component is intentionally added.

The composition is useful as a replacement for poly(vinyl chloride) (PVC) in many applications. One advantage of substituting the composition for PVC is that the composition can be essentially free of halogens. Thus, in some embodiments, the composition comprises less than 1 weight percent total of halogens (fluorine, chlorine, bromine, and iodine). In some embodiments, the composition comprises less than 0.1 weight percent total of halogens. In some embodiments, the composition comprises no intentionally added halogens.

In some embodiments, the composition comprises a continuous polyolefin phase and a dispersed poly(arylene ether) phase. In other words, the composition comprises a continuous phase comprising polyolefin and a dispersed phase comprising poly(arylene ether). The presence of such phases can be detected by transmission electron microscopy as described in the working examples. The hydrogenated block copolymer can reside in a continuous phase, a dispersed phase, or at an interface between continuous and dispersed phases or between co-continuous phases.

The composition can be used to form articles that exhibit excellent physical properties and improved retention of those properties after chemical exposure. For example, articles formed from the composition are flexible. The composition's flexibility can be expressed as a flexural modulus less than or equal to 900 megapascals measured at 23° C. according to ASTM D790. In some embodiments, the composition has a flexural modulus of 425 to 829 megapascals measured at 23° C. according to ASTM D790. The composition's chemical resistance can be expressed as retention of at least 65 percent of its ribbon tensile strength after 20 hours immersion in a 50:50 weight/weight mixture of kerosene and SAE 10W30 motor oil at 50° C. A detailed procedure for the chemical resistance test is given in the working examples below. In some embodiments, the composition retains 40 to 77.1 percent of its ribbon tensile strength after 20 hours immersion in a 50:50 weight/weight mixture of kerosene and SAE 10W30 motor oil at 50° C.

One embodiment is a composition consisting of the reaction product obtained on melt kneading a composition consisting of: about 10 to about 35 weight percent of a poly(arylene ether); about 15 to about 40 weight percent of a polyolefin; about 10 to about 35 weight percent of an acid-functionalized hydrogenated block copolymer of an alkenyl aromatic compound and a conjugated diene; wherein the acid-functionalized hydrogenated block copolymer has a poly(alkenyl aromatic) content of at least 15 weight percent, based on the total weight of the acid-functionalized hydrogenated block copolymer; about 0.01 to about 5 weight percent of a polyamine compound; optionally, up to 10 weight percent of an unfunctionalized hydrogenated block copolymer of an alkenyl aromatic compound and a conjugated diene; optionally, up to 5 weight percent of an unhydrogenated block copolymer of an alkenyl aromatic compound and a conjugated diene; and optionally, an additive selected from the group consisting of stabilizers, mold release agents, processing aids, flame retardants, drip retardants, nucleating agents, UV blockers, dyes, pigments, antioxidants, anti-static agents, blowing agents, mineral oil, metal deactivators, antiblocking agents, nanoclays, and combinations thereof; wherein all weight percents are based on the total weight of the composition, unless a different weight basis is specified; wherein the composition has a ribbon tensile strength of at least 15 megapascals measured at 23° C. according to JIS K6251; wherein the composition retains at least 40 percent of its ribbon tensile strength after 20 hours immersion in a –50:50 weight/weight mixture of kerosene and SAE 10W30 motor oil at 50° C.; and wherein the composition has a flexural modulus less than or equal to 900 megapascals measured at 23° C. according to ASTM D790. In some embodiments, the composition has a ribbon tensile strength of 15 to 37.1 megapascals measured at 23° C. according to JIS K6251; the composition retains 40 to 77.1 percent of its ribbon tensile strength after 20 hours immersion in a 50:50 weight/weight mixture of kerosene and SAE 10W30 motor oil at 50° C.; and the composition has a flexural modulus of 425 to 900 megapascals measured at 23° C. according to ASTM D790.

One embodiment is a composition comprising the reaction product obtained on melt kneading a composition, comprising: about 15 to about 35 weight percent of a poly(2,6-dimethyl-1,4-phenylene ether) having an intrinsic viscosity of about 0.3 to about 0.6 deciliter per gram, measured at 25° C. in chloroform; about 20 to about 35 weight percent of a polyolefin selected from the group consisting of polypropylene, high density polyethylene, and combinations thereof; about 10 to about 30 weight percent of an acid-functionalized hydrogenated block copolymer that is a maleic anhydride-grafted polystyrene-poly(ethylene-butylene)-polystyrene triblock copolymer; wherein the acid-functionalized hydrogenated block copolymer has a weight average molecular weight of 200,000 to about 400,000 atomic mass units and a polystyrene content of about 25 to about 35 weight percent based on the total weight of the acid-functionalized hydrogenated block copolymer; about 1 to about 8 weight percent of an unfunctionalized polystyrene-poly(ethylene/butylene)-polystyrene triblock copolymer; about 0.01 to about 5 weight percent of a polyethyleneimine having a number average molecular weight of about 100 to about 1,000,000 atomic mass units; about 1 to about 10 weight percent of melamine polyphosphate; about 2 to about 10 weight percent of magnesium hydroxide; and about 5 to about 20 weight percent of a triaryl phosphate flame retardant; wherein all weight percents are based on the total weight of the composition unless a different weight basis is specified; wherein the composition has a ribbon tensile strength of at least 15 megapascals measured at 23° C. according to JIS K6251; wherein the composition retains at least 60 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790. In some embodiments, the composition has a ribbon tensile strength of 15 to 37.1 megapascals, a ribbon tensile strength retention of 60 to 77.1 percent after kerosene/oil immersion, and a flexural modulus of 425 to 900 megapascals.

One embodiment is a composition consisting of the reaction product obtained on melt kneading a composition, consisting of: about 15 to about 35 weight percent of a poly(2,6-dimethyl-1,4-phenylene ether) having an intrinsic viscosity of about 0.3 to about 0.6 deciliter per gram, measured at 25° C. in chloroform; about 20 to about 35 weight percent of a polyolefin selected from the group consisting of polypropylene, high density polyethylene, and combinations thereof; about 10 to about 30 weight percent of an acid-functionalized hydrogenated block copolymer that is a maleic anhydride-grafted polystyrene-poly(ethylene-butylene)-polystyrene triblock copolymer; wherein the acid-functionalized hydrogenated block copolymer has a weight average molecular weight of 200,000 to about 400,000 atomic mass units and a polystyrene content of about 25 to about 35 weight percent based on the total weight of the acid-functionalized hydrogenated block copolymer about 1 to about 8 weight percent of an unfunctionalized polystyrene-poly(ethylene/butylene)-polystyrene triblock copolymer; about 0.01 to about 5 weight percent of a polyethyleneimine having a number average molecular weight of about 100 to about 1,000,000 atomic mass units; optionally, up to 5 weight percent of an unhydrogenated block copolymer of an alkenyl aromatic compound and a conjugated diene; optionally, an additive selected from the group consisting of stabilizers, mold release agents, processing aids, flame retardants, drip retardants, nucleating agents, UV blockers, dyes, pigments, antioxidants, anti-static agents, blowing agents, mineral oil, metal deactivators, antiblocking agents, nanoclays, and combinations thereof; about 1 to about 10 weight percent of melamine polyphosphate; about 2 to about 10 weight percent of magnesium hydroxide; and about 5 to about 20 weight percent of a triaryl phosphate flame retardant; wherein all weight percents are based on the total weight of the composition, unless a different weight basis is specified; wherein the composition has a ribbon tensile strength of at least 15 megapascals measured at 23° C. according to JIS K6251; wherein the composition retains at least 60 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790. In some embodiments, the composition has a ribbon tensile strength of 15 to 37.1 megapascals, a ribbon tensile strength retention of 60 to 77.1 percent after kerosene/oil immersion, and a flexural modulus of 425 to 900 megapascals.

One embodiment is a composition comprising the reaction product obtained on melt kneading a composition, comprising: about 18 to about 25 weight percent of a poly(2,6-dimethyl-1,4-phenylene ether) having an intrinsic viscosity of about 0.3 to about 0.6 deciliter per gram, measured at 25° C. in chloroform; about 20 to about 30 weight percent of a polyolefin selected from the group consisting of polypropylene, high density polyethylene, and combinations thereof; about 15 to about 25 weight percent of an acid-functionalized hydrogenated block copolymer that is a maleic anhydride-grafted polystyrene-poly(ethylene-butylene)-polystyrene triblock copolymer; wherein the acid-functionalized hydrogenated block copolymer has a weight average molecular weight of 200,000 to about 400,000 atomic mass units and a polystyrene content of about 25 to about 35 weight percent based on the total weight of the acid-functionalized hydrogenated block copolymer; about 1 to about 8 weight percent of an unfunctionalized polystyrene-poly(ethylene/butylene)-polystyrene triblock copolymer; about 0.01 to about 5 weight percent of a polyethyleneimine having a number average molecular weight of about 100 to about 1,000,000 atomic mass units; about 1 to about 10 weight percent of melamine polyphosphate; about 2 to about 10 weight percent of magnesium hydroxide; and about 5 to about 20 weight percent of a triaryl phosphate flame retardant; wherein all weight percents are based on the total weight of the composition, unless a different weight basis is specified; wherein the composition has a ribbon tensile strength of at least 15 megapascals measured at 23° C. according to JIS K6251; wherein the composition retains at least 60 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790.

Other embodiments include methods of preparing the composition. The composition can be prepared by melt kneading the components. Thus, one embodiment is a method of preparing a thermoplastic composition, comprising: melt kneading about 10 to about 35 weight percent of a poly(arylene ether); about 15 to about 40 weight percent of a polyolefin; about 10 to about 35 weight percent of an acid-functionalized hydrogenated block copolymer of an alkenyl aromatic compound and a conjugated diene; wherein the acid-functionalized hydrogenated block copolymer has a poly(alkenyl aromatic) content of at least 15 weight percent, based on the total weight of the acid-functionalized hydrogenated block copolymer; and about 0.01 to about 5 weight percent of a polyamine compound; wherein all weight percents are based on the total weight of the composition, unless a different weight basis is specified; wherein the composition has a ribbon tensile strength of at least 15 megapascals measured at 23° C. according to JIS K6251; wherein the composition retains at least 40 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790. Apparatus suitable for melt kneading includes, for example, a two-roll mill, a Banbury mixer, and a single-screw or twin-screw extruder. In some embodiments, melt kneading comprises using a twin-screw extruder.

Another embodiment is a method of preparing a thermoplastic composition, comprising: melt kneading about 15 to about 35 weight percent of a poly(2,6-dimethyl-1,4-phenylene ether) having an intrinsic viscosity of about 0.3 to about 0.6 deciliter per gram, measured at 25° C. in chloroform; about 20 to about 35 weight percent of a polyolefin selected from the group consisting of polypropylene, high density polyethylene, and combinations thereof; about 10 to about 30 weight percent of an acid-functionalized hydrogenated block copolymer that is a maleic anhydride-grafted polystyrene-poly(ethylene-butylene)-polystyrene triblock copolymer; wherein the acid-functionalized hydrogenated block copolymer has a weight average molecular weight of 200,000 to about 400,000 atomic mass units and a polystyrene content of about 25 to about 35 weight percent based on the total weight of the acid-functionalized hydrogenated block copolymer; about 1 to about 8 weight percent of an unfunctionalized polystyrene-poly(ethylene/butylene)-polystyrene triblock copolymer; about 0.01 to about 5 weight percent of a polyethyleneimine having a number average molecular weight of about 100 to about 1,000,000 atomic mass units; about 1 to about 10 weight percent of melamine polyphosphate; about 2 to about 10 weight percent of magnesium hydroxide; and about 5 to about 20 weight percent of a triaryl phosphate flame retardant to form a blend; wherein all weight percents are based on the total weight of the composition, unless a different weight basis is specified; and melt filtering the blend through a filter comprising openings with diameters of about 20 micrometers to about 150 micrometers; wherein the composition has a ribbon tensile strength of at least 15 megapascals measured at 23° C. according to JIS K6251; wherein the composition retains 46.9 to 77.1 percent of its ribbon tensile strength after 20 hours immersion in a 50:50 weight/weight mixture of kerosene and SAE 10W30 motor oil at 50° C.; and wherein the composition has a flexural modulus of 425 to 900 megapascals measured at 23° C. according to ASTM D790. With regard to the melt filtering step, the opening diameters can specifically be about 30 to about 130 micrometers, more specifically about 40 to about 110 micrometers. In some embodiments the molten mixture is melt filtered through one or more filters having openings with a maximum diameter that is less than or equal to half of the minimum thickness of an article to be molded or extruded from the composition. Suitable apparatuses and procedures for melt filtration are described, for example, in U.S. Patent Application Publication Nos. US 2005/0046070 A1 and US 2005/0064129 A1 of Dong et al., and US 2005/0250932 A1 of Hossan et al. When the composition is prepared using an extruder, the physical properties of the composition can be improved if the polyolefin is added downstream of the other components. Thus, in some embodiments, the poly(2,6-dimethyl-1,4-phenylene ether), the polystyrene-poly(ethylene/butylene)-polystyrene triblock copolymer, the melamine polyphosphate, the magnesium hydroxide, and the triaryl phosphate flame retardant are melt kneaded to form a first blend, and the first blend and the polyolefin are melt kneaded to form a second blend.

Other embodiments include articles comprising any of the compositions described above. For example, an article can comprise a film, sheet, molded object, or composite, wherein the film, sheet, molded object or composite comprises at least one layer comprising the composition. Articles can be prepared from the composition using fabrication methods known in the art, including, for example, single layer and multilayer foam extrusion, single layer and multilayer sheet extrusion, injection molding, blow molding, extrusion, film extrusion, profile extrusion, pultrusion, compression molding, thermoforming, pressure forming, hydroforming, vacuum forming, foam molding, and the like. Combinations of the foregoing article fabrication methods can be used. The composition is suitable for use as a covering for electrically or optically conducting wire and cable. The composition is particularly suitable for fabricating tubes for sheathing (bundling) automotive wiring harnesses. Such tubes often have an internal diameter of about 2 to about 30 millimeters and a wall thickness of about 0.2 to about 1.2 millimeters.

The invention is further illustrated by the following non-limiting examples.

EXAMPLES 1-9, COMPARATIVE EXAMPLES 1-3

These examples illustrate how retention of physical properties after solvent exposure is improved by using a crosslinked, high molecular weight, hydrogenated block copolymer, and by feeding the polyolefin downstream while melt kneading in an extruder.

The poly(arylene ether) (PPE) was a poly(2,6-dimethyl-1,4-phenylene ether) having an intrinsic viscosity of about 0.46 deciliter per gram (dL/g), measured in chloroform at 25° C., obtained as PPO*646 from GE Plastics. A high density polyethylene (HDPE) reported to have a melt flow rate of 0.7 grams per 10 minutes (g/10 min), determined according to ASTM D1238 at a temperature of 190° C. and a load of 2.16 kilograms, was obtained as LR5900-00 from Equistar. A polystyrene-poly(ethylene/butylene)-polystyrene triblock copolymer having a styrene content of 30 weight percent based on the total weight of the block copolymer, and a weight average molecular weight of 117,000 AMU was obtained from KRATON Polymers under the grade name KRATON G 1650, and is referred to in Table 1 as "SEBS I". A polystyrene-poly(ethylene/butylene)-polystyrene triblock copolymer having a styrene content of 67 weight percent based on the total weight of the block copolymer, and a weight average molecular weight of about 400,000 to 56,000 atomic mass units (AMU) was obtained as TUFTEC H1043 from Asahi Chemical, and is referred to in Table 1 as "SEBS II". A polypropylene having a melt flow rate of 1.5 grams per ten minutes (g/10 min) was obtained as D-015-C from Sunoco Chemicals. Melt flow rate can be determined according to ASTM D1238-04c using either powdered or pelletized polymers, a load of 2.16 kilograms, and a temperature of 190° C. for polyethylenes and 230° C. for polypropylenes. Melamine polyphosphate ("MPP" in Table 1) was obtained as Melapur 200 from Ciba Specialty Chemicals. Magnesium hydroxide ("Mg(OH)$_2$" in Table 1) was obtained as Magshield UF NB10 from Martin Marietta. A hindered phenolic antioxidant ("Phen. AO" in Table 1), pentaerythritol tetrakis (3-(3,5-di-tert-butyl-4-hydroxy-phenyl)propionate), CAS Reg. No. 6683-19-8, was obtained as Irganox 1010 from Ciba Specialty Chemicals. A phosphite antioxidant ("Phos. AO" in Table 1), bis(2,4-di-tert-butylphenyl)pentaerythritol diphosphite, CAS Reg. No. 26741-53-7, was obtained as Ultranox 626 from Chemtura Corporation. A polyethyleneimine having a molecular weight of about 600 AMU was obtained as EPOMIN SP-006 from Nippon Shokubai ("EPOMIN SP-006" in Table 1). A maleic anhydride-grafted polystyrene-poly(ethylene/butylene)-polystyrene block copolymer having a polystyrene content of 30 weight percent, a bound maleic anhydride content of 1.7 weight percent, and a weight average molecular weight of 90,000 AMU was obtained as KRATON FG 1901 from KRATON Polymers ("FXNSEBS I" in Table 1). A maleic anhydride-grafted polystyrene-poly(ethylene/butylene)-polystyrene block copolymer having a polystyrene content of 13 weight percent, a bound maleic anhydride content of 1.0 weight percent, and a weight average molecular weight of about 80,000 AMU was obtained as KRATON FG 1924 from KRATON Polymers ("FXNSEBS II" in Table 2). A maleic anhydride-grafted polystyrene-poly (ethylene/butylene)-polystyrene block copolymer having a styrene content of 33 weight percent, a bound maleic anhydride content of 1.0 weight percent, and a weight average molecular weight of 288,960 AMU was obtained as KRATON MD6684 CS from KRATON Polymers ("FXNSEBS III" in Table 1). Resorcinol bis(diphenyl phosphate) (RDP; Chemical Abstracts Services Registry No. 57583-54-7) was obtained from Supresta. Mineral oil was obtained from Penreco.

Components were blended in a melt kneading process. A dry blend containing the poly(arylene ether), the hydrogenated block copolymers, the polyamine compound, melamine polyphosphate, magnesium hydroxide, mineral oil, Phos. AO, Phen. AO, and in some cases the polyolefin was added in the feed throat in a 30-millimeter, 10-zone twin-screw extruder operating at 350 rotations per minute with barrel temperatures from feed throat to die of 240° C., 260° C., 270° C., and 270° C. The twin-screw extruder uses downstream feeders in zone 3 and zone 7 out of 10 zones. The zone 3 feeder was used to add RDP. The zone 7 feeder was used in some cases for addition of polyolefin. A vacuum vent was located in zone 10 with 20-25 inches of mercury vacuum being applied. The feed rate was about 16 to 18 kilograms per hour (35-40 pounds per hour). The screw design employed had fairly intensive mixing in zones 2 to 4 with relatively mild mixing in zone 9. The extrudate was cooled and pelletized. Test samples were injection molded using a barrel temperature of 240° C. and a mold temperature of 65° C.

Flexural modulus values, expressed in megapascals (MPa), were measured according to ASTM D790-03, Method A at 23° C. using samples having a depth of 3.2 millimeters and a width of 12.7 millimeters, a support span length of 5.08 centimeters (2 inches), and a crosshead motion rate of 1.27 millimeter/minute (0.05 inch/minute). Notched Izod impact strength values, expressed in joules per meter (J/m), were measured according to ASTM D256-06, Method A at 23° C. using a 0.907 kilogram (2.00 pound) hammer, and specimens having a notch such that at least 1.02 centimeter (0.4 inch) of the original 1.27 centimeter (0.5 inch) depth remained under the notch; the specimens were conditioned for 24 hours at 23° C. after notching. Heat deflection temperature values, expressed in degrees centigrade (° C.), were measured according to ASTM D648-06, Method B using a load of 0.45 megapascals and injection molded specimens having a width of 3.20 millimeters and a depth of 12.80 millimeters; specimens were conditioned for 24 hours at 23° C. before testing. For heat deflection testing, samples were immersed in silicone oil, which was heated at 2° C. per minute from an initial temperature less than 30° C. Tensile elongation values ("Average elongation at break (%)" in Table 1), expressed in units of percent, and tensile strength values ("Average stress at break (MPa)" in Table 1), expressed in units of megapascals, were determined at break using ASTM D638-03 at a temperature of 23° C. and a pull rate of 50 millimeters per minute using Type I bars having thickness of 3.2 millimeters. The values presented in Table 1 represent the average of three samples. Dynatup total energy values were determined at 23° C. and −30° C. according to ASTM D3763-06 using a velocity of 3.3 meters/seconds and disks having a thickness of 3.2 millimeters. Vicat softening temperature values were measured according to ASTM D1525-06 using a 10 Newton load and a rate of temperature change of 120° C./hour.

The tensile test used in the oil resistance test was a modified version of JIS K6251:2004. Each composition to be tested was extruded as a ribbon having a width of about 4 centimeters and a thickness of about 0.52 millimeters. Dumbbell-shaped test pieces as specified in JIS K6251:2004 Type 3 were pressed out from the ribbons. The test pieces had a uniform thickness of about 0.52 millimeters, a width of 25 millimeters on the last 15 millimeters of each end, a gradual narrowing of the width for the portion 15 to 40 millimeters from each end, and a narrow center width 20 millimeters long. The test piece was attached to the tensile tester and pulled at a constant rate of 200 millimeters per minute. The gage length was set at 33 mm and the elongation ("Ribbon tensile elongation at break (%)" in Table 1) was defined as the ratio of the total extension to the gage length. For example, if the total extension is 88 mm, then elongation is 266% (88/33×100). The tensile strength ("Ribbon tensile strength (MPa)" in Table 1) was defined as the ratio of the tensile force at break to the cross-sectional area of the test piece. The oil resistance test was a modified version of ISO1817:2005 with the above test pieces. These test pieces were immersed in a 50:50 weight/weight mixture of kerosene and SAE 10W30 motor oil for 20 hours at 50° C. Samples were then removed from the kerosene-oil mixture, wiped, and allowed to dry at 23° C. and 50% relative humidity for four hours before the post-soak tensile strength test ("Post-soak ribbon tensile strength (MPa)" in Table 1).

Compositions and properties are presented in Table 1.

TABLE 1

|  | C. Ex. 1 | Ex. 1 | C. Ex. 2 | Ex. 2 |
| --- | --- | --- | --- | --- |
| | Compositions | | | |
| PPE | 32.29 | 32.20 | 32.20 | 32.20 |
| MPP | 3.69 | 3.68 | 3.68 | 3.68 |
| Mg(OH)$_2$ | 3.69 | 3.68 | 3.68 | 3.68 |
| SEBS I | 6.46 | 6.44 | 6.44 | 6.44 |
| SEBS II | 2.77 | 2.76 | 2.76 | 2.76 |
| PP (upstream) | 20.76 | 20.70 | 20.70 | 20.70 |
| Mineral Oil | 0 | 0 | 0 | 0 |
| Phen. AO | 0.18 | 0.18 | 0.18 | 0.18 |
| Phos. AO | 0.18 | 0.18 | 0.18 | 0.18 |
| EPOMIN SP-006 | 0 | 0.28 | 0.28 | 0.28 |
| FXNSEBS I | 20.76 | 20.70 | 0 | 0 |
| FXNSEBS II | 0 | 0 | 20.70 | 0 |
| FXNSEBS III | 0 | 0 | 0 | 20.70 |
| HDPE | 0 | 0 | 0 | 0 |
| PP (downstream) | 0 | 0 | 0 | 0 |
| RDP | 9.23 | 9.20 | 9.20 | 9.20 |

TABLE 1-continued

| Properties | | | | |
|---|---|---|---|---|
| Flexural Modulus (MPa) | 427 | 586 | 434 | 645 |
| Ribbon tensile strength (MPa) | 33.8 | 37.1 | 35.5 | 35.4 |
| Post-soak ribbon tensile strength (MPa) | 9.4 | 13.8 | 10.3 | 16.6 |
| Tensile strength retention (%) | 27.9 | 37.1 | 29.0 | 46.9 |
| Ribbon tensile elongation at break (%) | 143.0 | 207.0 | 195.0 | 207.0 |
| Average elongation at break (%) | 150 | 110 | 82 | 85 |
| Average stress at break (MPa) | 30.8 | 27.4 | 18.3 | 25.9 |
| Average heat deflection temperature (° C.) | 71 | 81 | 83.3 | 84.7 |
| Total Dynatup energy @ 23° C. (J) | 41.3 | 33.2 | 30.9 | 25.1 |
| Total Dynatup energy @ −30° C. (J) | 36 | 22.8 | 25.9 | 6.8 |
| Impact Strength (J/m) | 532 | 395 | 410 | 363 |
| Vicat Temperature (° C.) | 111 | 126 | 119 | 130 |

| | Ex. 3 | C. Ex. 3 | Ex. 4 |
|---|---|---|---|
| Compositions | | | |
| PPE | 32.20 | 32.20 | 32.20 |
| MPP | 3.68 | 3.68 | 3.68 |
| Mg(OH)$_2$ | 3.68 | 3.68 | 3.68 |
| SEBS II | 6.44 | 6.44 | 6.44 |
| SEBS III | 2.76 | 2.76 | 2.76 |
| PP (upstream) | 0 | 0 | 0 |
| Mineral Oil | 0 | 0 | 0 |
| Phen. AO | 0.18 | 0.18 | 0.18 |
| Phos. AO | 0.18 | 0.18 | 0.18 |
| EPOMIN SP-006 | 0.28 | 0.28 | 0.28 |
| FXNSEBS I | 20.70 | 0 | 0 |
| FXNSEBS II | 0 | 20.70 | 0 |
| FXNSEBS III | 0 | 0 | 20.70 |
| HDPE | 0 | 0 | 0 |
| PP (downstream) | 20.70 | 20.70 | 20.70 |
| RDP | 9.23 | 9.20 | 9.20 |
| Properties | | | |
| Flexural Modulus (MPa) | 569 | 515 | 859 |
| Ribbon tensile strength (MPa) | 37.1 | 38.4 | 35.8 |
| Post-soak ribbon tensile strength (MPa) | 15.0 | 10.8 | 22.0 |
| Ribbon tensile strength retention (%) | 40.3 | 28.1 | 61.4 |
| Ribbon tensile elongation at break (%) | 204.0 | 207.0 | 229.0 |
| Average elongation at break (%) | 110 | 73 | 110 |
| Average stress at break (MPa) | 28.3 | 23.5 | 27.7 |
| Average heat deflection temperature (° C.) | 87 | 85.7 | 83.4 |
| Total Dynatup energy @ 23° C. (J) | 35.7 | 31.6 | 28.3 |
| Total Dynatup energy @ −30° C. (J) | 20.9 | 25.1 | 20.4 |
| Impact Strength (J/m) | 420 | 416 | 385 |
| Vicat Temperature (° C.) | 129 | 122 | 129 |

| | Ex. 5 | Ex. 6 | Ex. 7 | Ex. 8 | Ex. 9 |
|---|---|---|---|---|---|
| Compositions | | | | | |
| PPE | 22.58 | 22.58 | 21.42 | 21.93 | 21.93 |
| MPP | 4.52 | 4.52 | 6.86 | 6.26 | 6.26 |
| Mg(OH)$_2$ | 4.52 | 4.52 | 6.86 | 6.26 | 6.26 |
| SEBS II | 0 | 0 | 0 | 2.35 | 2.35 |
| SEBS III | 4.52 | 4.52 | 4.28 | 0 | 0 |
| PP (upstream) | 0 | 0 | 0 | 0 | 0 |
| Mineral Oil | 4.52 | 4.52 | 4.28 | 3.92 | 3.92 |
| Phen. AO | 0.18 | 0.18 | 0.17 | 0.16 | 0.16 |
| Phos. AO | 0.18 | 0.18 | 0.17 | 0.16 | 0.16 |
| EPOMIN SP-006 | 0.27 | 0.27 | 0.26 | 0.23 | 0.23 |
| FXNSEBS I | 0 | 0 | 0 | 0 | 0 |
| FXNSEBS II | 0 | 0 | 0 | 0 | 0 |
| FXNSEBS III | 22.58 | 22.58 | 21.42 | 19.58 | 15.66 |
| HDPE | 27.10 | 0 | 25.71 | 23.49 | 27.41 |
| PP (downstream) | 0 | 27.10 | 0 | 0 | 0 |
| RDP | 9.03 | 9.03 | 8.57 | 15.66 | 15.66 |
| Properties | | | | | |
| Flexural Modulus (MPa) | 550 | 651 | 493 | 425 | 446 |
| Ribbon tensile strength (MPa) | 23.3 | 29.15 | 21.0 | 18.6 | 17.7 |
| Post-soak ribbon tensile strength (MPa) | 15.2 | 20.3 | 16.2 | 12.12 | 12.9 |
| Ribbon tensile strength retention (%) | 65.2 | 69.6 | 77.1 | 65.2 | 72.7 |
| Ribbon tensile elongation at break (%) | 249.0 | 311.8 | 223.6 | 178.3 | 171.9 |
| Average elongation at break (%) | 120 | 210 | 130 | 54 | 36 |
| Average stress at break (MPa) | 18.1 | 27 | 17.1 | 13.3 | 12.7 |

TABLE 1-continued

| | | | | | |
|---|---|---|---|---|---|
| Average heat deflection temperature (° C.) | 62.9 | 67 | 57.8 | 61.1 | 61.3 |
| Total Dynatup energy @ 23° C. (J) | 24.1 | 32.2 | 23.6 | 12.4 | 9.76 |
| Total Dynatup energy @ −30° C. (J) | 14.1 | 17.5 | 13.9 | 2.32 | 1.56 |
| Impact Strength (J/m) | 476 | 407 | 472 | 255 | 131 |
| Vicat Temperature (° C.) | 107 | 121 | 103 | 101 | 103 |

The results show that Comparative Example 1, which does not contain any crosslinker, manifests the lowest strength retention after kerosene/oil soaking. Recall that percent tensile strength retention after chemical exposure, rather than the absolute value of tensile strength after chemical exposure, is the best indicator of chemical resistance. Examples 1 and 2 and Comparative Example 2 contain polypropylene that was fed upstream, while Examples 3 and 4 and Comparative Example 3 contain polypropylene that was fed downstream. The samples prepared using downstream addition of polypropylene exhibit better mechanical properties and retention of those properties after kerosene/oil soaking when compared to samples prepared using upstream addition of polypropylene. Examples 1 and 2 and Comparative Example 2 have similar compositions, but they differ in the molecular weight of the acid-functionalized block copolymer. Example 2 contains FXNSEBS III, which is of higher weight average molecular weight than FXNSEBS I and FXNSEBS II found in Example 1 and Comparative Example 2, respectively. Example 2 shows a much higher strength retention after soaking than Example 1 and Comparative Example 2. Examples 3 and 4 and Comparative Example 3 corroborate this effect. Comparative Examples 2 and 3 contain FXNSEBS II, which contains only 13% styrene. The relatively poor initial ribbon tensile strength of these examples illustrate the importance of using an acid-functionalized hydrogenated block copolymer with a poly(alkenyl aromatic) content of at least 15 weight percent. Examples 5-9 all contain FXNSEBS III, the high molecular weight acid functionalized block copolymer. These examples exhibit the highest strength retention after kerosene/oil soaking.

The sample corresponding to Example 8 was analyzed by transmission electron microscopy. To prepare a sample for electron microscopy, the composition is injection molded into a disc having a 3.2 millimeters thickness as is used in an ASTM D 3763-02 (Dynatup impact strength) test. A portion located at the center (in terms of diameter) of the disc is removed and then sections having a thickness of 100 nanometers are removed from the center (in terms of thickness) of the portion. The sections are stained in freshly prepared ruthenium tetroxide staining solution for 30 seconds. The microscopy studies can be performed on an electron microscope such as a Technai G2. Digital image acquisition can be performed using a camera such as a Gatan Model 791 side mount camera. Representative micrographs are presented in the FIGURE. In the micrographs, the lightest areas correspond to high density polyethylene, the gray areas correspond to poly(arylene ether), and the areas of dark honeycomb-like structure correspond to block copolymer. The micrographs show that this sample has a well-dispersed poly(arylene ether) phase within a continuous polyethylene phase.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A composition comprising the reaction product obtained on melt kneading a composition comprising:
   about 10 to about 35 weight percent of a poly(arylene ether);
   about 15 to about 40 weight percent of a polyolefin;
   about 10 to about 35 weight percent of an acid-functionalized hydrogenated block copolymer of an alkenyl aromatic compound and a conjugated diene; wherein the acid-functionalized hydrogenated block copolymer has a poly(alkenyl aromatic) content of at least 15 weight percent, based on the total weight of the acid-functionalized hydrogenated block copolymer; and
   about 0.01 to about 5 weight percent of a polyamine compound;
   wherein all weight percents are based on the total weight of the composition unless a different weight basis is specified;
   wherein the composition has a ribbon tensile strength of at least 15 megapascals measured at 23° C. according to JIS K6251;
   wherein the composition retains at least 40 percent of its ribbon tensile strength after 20 hours immersion in a 50:50 weight/weight mixture of kerosene and SAE 10W30 motor oil at 50° C.; and
   wherein the composition has a flexural modulus less than or equal to 900 megapascals measured at 23° C. according to ASTM D790.

2. The composition of claim 1, wherein the composition has a ribbon tensile strength of 15 to 37.1 megapascals measured at 23° C. according to JIS K6251.

3. The composition of claim 1, wherein the composition retains 40 to 77.1 percent of its ribbon tensile strength after 20 hours immersion in a 50:50 weight/weight mixture of kerosene and SAE 10W30 motor oil at 50° C.

4. The composition of claim 1, wherein the composition retains 60 to 77.1 percent of its ribbon tensile strength after 20 hours immersion in a 50:50 weight/weight mixture of kerosene and SAE 10W30 motor oil at 50° C.

5. The composition of claim 1, wherein the composition has a flexural modulus of 425 to 900 megapascals measured at 23° C. according to ASTM D790.

6. The composition of claim 1, wherein the composition has a ribbon tensile strength of 15 to 37.1 megapascals measured at 23° C. according to JIS K6251; wherein the composition retains 40 to 77.1 percent of its ribbon tensile strength after 20 hours immersion in a 50:50 weight/weight mixture of kerosene and SAE 10W30 motor oil at 50° C.; and wherein the composition has a flexural modulus of 425 to 900 megapascals measured at 23° C. according to ASTM D790.

7. The composition of claim 1, wherein the polyolefin is a homopolymer selected from the group consisting of polypropylene, high density polyethylene, and combinations thereof.

8. The composition of claim 1, wherein the polyolefin has a crystallinity content greater than or equal to 20 percent.

9. The composition of claim 1, wherein the polyolefin is a high density polyethylene having a melt flow rate of about 0.3 to about 10 grams per ten minutes, measured at 190° C. and 2.16 kilograms force according to ASTM D1238.

10. The composition of claim 1, wherein the polyolefin is a polypropylene having a melt flow rate of about 0.3 to about 10 grams per ten minutes, measured at 230° C. and 2.16 kilograms force according to ASTM D1238.

11. The composition of claim 1, wherein the acid-functionalized hydrogenated block copolymer has a poly(alkenyl aromatic) content of 15 to 45 weight percent, based on the total weight of the acid-functionalized hydrogenated block copolymer.

12. The composition of claim 1, wherein the acid-functionalized hydrogenated block copolymer has a weight average molecular weight greater than or equal to 200,000 atomic mass units.

13. The composition of claim 1, wherein the acid-functionalized hydrogenated block copolymer has a weight average molecular weight of 200,000 to about 500,000 atomic mass units.

14. The composition of claim 1, wherein the acid-functionalized hydrogenated block copolymer is a maleic anhydride-grafted hydrogenated block copolymer.

15. The composition of claim 1, wherein the acid-functionalized hydrogenated block copolymer is a linear block copolymer.

16. The composition of claim 1, wherein the acid-functionalized hydrogenated block copolymer excludes the residue of monomers other than the alkenyl aromatic compound, the conjugated diene, and an acid-functionalizing agent.

17. The composition of claim 1, wherein the conjugated diene consists of butadiene.

18. The composition of claim 1, wherein the acid-functionalized hydrogenated block copolymer is a maleic anhydride-grafted polystyrene-poly(ethylene-butylene)-polystyrene triblock copolymer.

19. The composition of claim 1, wherein the polyamine compound comprises at least 3 amine groups.

20. The composition of claim 1, wherein the polyamine compound consists of carbon, hydrogen, and nitrogen atoms.

21. The composition of claim 1, wherein the polyamine compound is substantially free of aliphatic and aromatic unsaturation.

22. The composition of claim 1, wherein the polyamine compound is selected from the group consisting of polyetheramines, polyalkyleneimines, polyalkyleneamines, and mixtures thereof.

23. The composition of claim 1, wherein the polyamine compound is a polyalkyleneimine.

24. The composition of claim 1, wherein the polyamine compound is a polyethyleneimine having a number average molecular weight of about 100 to about 1,000,000 atomic mass units.

25. The composition of claim 1, wherein the total amount of the poly(arylene ether) and the acid-functionalized hydrogenated block copolymer is at least 60 weight percent.

26. The composition of claim 1, further comprising an unfunctionalized hydrogenated block copolymer of an alkenyl aromatic compound and a conjugated diene.

27. The composition of claim 26, wherein the unfunctionalized hydrogenated block copolymer has a poly(alkenyl aromatic) content of about 10 to 45 weight percent, based on the total weight of the unfunctionalized hydrogenated block copolymer.

28. The composition of claim 26, wherein the unfunctionalized hydrogenated block copolymer has a poly(alkenyl aromatic) content greater than 45 weight percent and less than or equal to 90 weight percent, based on the total weight of the unfunctionalized hydrogenated block copolymer.

29. The composition of claim 26, wherein the unfunctionalized hydrogenated block copolymer has a weight average molecular weight of 200,000 to about 500,000 atomic mass units.

30. The composition of claim 1, being substantially free of an unfunctionalized hydrogenated block copolymer of an alkenyl aromatic compound and a conjugated diene.

31. The composition of claim 1, further comprising an unhydrogenated block copolymer of an alkenyl aromatic compound and a conjugated diene.

32. The composition of claim 1, being substantially free of an unhydrogenated block copolymer of an alkenyl aromatic compound and a conjugated diene.

33. The composition of claim 1, comprising a continuous polyolefin phase and a dispersed poly(arylene ether) phase.

34. A composition consisting of the reaction product obtained on melt kneading a composition consisting of:
about 10 to about 35 weight percent of a poly(arylene ether);
about 15 to about 40 weight percent of a polyolefin;
about 10 to about 35 weight percent of an acid-functionalized hydrogenated block copolymer of an alkenyl aromatic compound and a conjugated diene; wherein the acid-functionalized hydrogenated block copolymer has a poly(alkenyl aromatic) content of at least 15 weight percent, based on the total weight of the acid-functionalized hydrogenated block copolymer;
about 0.01 to about 5 weight percent of a polyamine compound;
optionally, up to 10 weight percent of an unfunctionalized hydrogenated block copolymer of an alkenyl aromatic compound and a conjugated diene;
optionally, up to 5 weight percent of an unhydrogenated block copolymer of an alkenyl aromatic compound and a conjugated diene; and
optionally, an additive selected from the group consisting of stabilizers, mold release agents, processing aids, flame retardants, drip retardants, nucleating agents, UV blockers, dyes, pigments, antioxidants, anti-static agents, blowing agents, mineral oil, metal deactivators, antiblocking agents, nanoclays, and combinations thereof;

wherein all weight percents are based on the total weight of the composition, unless a different weight basis is specified;

wherein the composition has a ribbon tensile strength of at least 15 megapascals measured at 23° C. according to JIS K6251;

wherein the composition retains at least 40 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790.

35. The composition of claim 34, wherein the composition has a ribbon tensile strength of 15 to 37.1 megapascals measured at 23° C. according to JIS K6251; wherein the composition retains 40 to 77.1 percent of its ribbon tensile strength after 20 hours immersion in a 50:50 weight/weight mixture of kerosene and SAE 10W30 motor oil at 50° C.; and wherein the composition has a flexural modulus of 425 to 900 megapascals measured at 23° C. according to ASTM D790.

36. A composition comprising the reaction product obtained on melt kneading a composition, comprising:

about 15 to about 35 weight percent of a poly(2,6-dimethyl-1,4-phenylene ether) having an intrinsic viscosity of about 0.3 to about 0.6 deciliter per gram, measured at 25° C. in chloroform;

about 20 to about 35 weight percent of a polyolefin selected from the group consisting of polypropylene, high density polyethylene, and combinations thereof;

about 10 to about 30 weight percent of an acid-functionalized hydrogenated block copolymer that is a maleic anhydridegrafted polystyrene-poly(ethylene-butylene)-polystyrene triblock copolymer; wherein the acid-functionalized hydrogenated block copolymer has a weight average molecular weight of 200,000 to about 400,000 atomic mass units and a polystyrene content of about 25 to about 35 weight percent based on the total weight of the acid-functionalized hydrogenated block copolymer;

about 1 to about 8 weight percent of an unfunctionalized polystyrene-poly(ethylene/butylene)-polystyrene triblock copolymer;

about 0.01 to about 5 weight percent of a polyethyleneimine having a number average molecular weight of about 100 to about 1,000,000 atomic mass units;

about to about 1 weight percent of melamine polyphosphate;

about 2 to about 10 weight percent of magnesium hydroxide; and about 5 to about 20 weight percent of a triaryl phosphate flame retardant;

wherein all weight percents are based on the total weight of the composition unless a different weight basis is specified;

wherein the composition has a ribbon tensile strength of at least 15 megapascals measured at 23° C. according to JIS K6251;

wherein the composition retains at least 60 percent of its ribbon tensile strength after 20 hours immersion in a 50:50 weight/weight mixture of kerosene and SAL 10W30 motor oil at 50° C.; and wherein the composition has a flexural modulus less than or equal to 900 megapascals measured at 23° C. according to ASTM D790.

37. The composition of claim 36, having a ribbon tensile strength of 15 to 37.1 megapascals, a ribbon tensile strength retention of 60 to 77.1 percent after kerosene/oil immersion, and a flexural modulus of 425 to 900 megapascals.

38. A composition consisting of the reaction product obtained on melt kneading a composition, consisting of:

about 15 to about 35 weight percent of a poly(2,6-dimethyl-1,4-phenylene ether) having an intrinsic viscosity of about 0.3 to about 0.6 deciliter per gram, measured at 25° C. in chloroform;

about 20 to about 35 weight percent of a polyolefin selected from the group consisting of polypropylene, high density polyethylene, and combinations thereof;

about 10 to about 30 weight percent of an acid-functionalized hydrogenated block copolymer that is a maleic anhydridegrafted polystyrene-poly(ethylene-butylene)-polystyrene triblock copolymer; wherein the acid-functionalized hydrogenated block copolymer has a weight average molecular weight of 200,000 to about 400,000 atomic mass units and a polystyrene content of about 25 to about 35 weight percent based on the total weight of the acid-functionalized hydrogenated block copolymer;

about 1 to about 8 weight percent of an unfunctionalized polystyrene-poly(ethylene/butylene)-polystyrene triblock copolymer;

about 0.01 to about 5 weight percent of a polyethyleneimine having a number average molecular weight of about 100 to about 1,000,000 atomic mass units;

optionally, up to 5 weight percent of an unhydrogenated block copolymer of an alkenyl aromatic compound and a conjugated diene;

optionally, an additive selected from the group consisting of stabilizers, mold release agents, processing aids, flame retardants, drip retardants, nucleating agents, UV blockers, dyes, pigments, antioxidants, anti-static agents, blowing agents, mineral oil, metal deactivators, antiblocking agents, nanoclays, and combinations thereof;

about 1 to about 10 weight percent of melamine polyphosphate;

about 2 to about 10 weight percent of magnesium hydroxide; and about 5 to about 20 weight percent of a triaryl phosphate flame retardant;

wherein all weight percents are based on the total weight of the composition, unless a different weight basis is specified;

wherein the composition has a ribbon tensile strength of at least 15 megapascals measured at 23° C. according to JIS K6251;

wherein the composition retains at least 60 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790.

39. The composition of claim 38, having a ribbon tensile strength of 15 to 37.1 megapascals, a ribbon tensile strength retention of 60 to 77.1 percent after kerosene/oil immersion, and a flexural modulus of 425 to 900 megapascals.

40. A composition comprising the reaction product obtained on melt kneading a composition, comprising:

about 18 to about 25 weight percent of a poly(2,6-dimethyl-1,4-phenylene ether) having an intrinsic viscosity of about 0.3 to about 0.6 deciliter per gram, measured at 25° C. in chloroform;

about 20 to about 30 weight percent of a polyolefin selected from the group consisting of polypropylene, high density polyethylene, and combinations thereof;

about 15 to about 25 weight percent of an acid-functionalized hydrogenated block copolymer that is a maleic anhydridegrafted polystyrene-poly(ethylene-butylene)-polystyrene triblock copolymer; wherein the acid-functionalized hydrogenated block copolymer has a weight average molecular weight of 200,000 to about 400,000 atomic mass units and a polystyrene content of about 25 to about 35 weight percent based on the total weight of the acid-functionalized hydrogenated block copolymer;

about 1 to about 8 weight percent of an unfunctionalized polystyrene-poly(ethylene/butylene)-polystyrene triblock copolymer;

about 0.01 to about 5 weight percent of a polyethyleneimine having a number average molecular weight of about 100 to about 1,000,000 atomic mass units;

about 1 to about 10 weight percent of melamine polyphosphate;

about 2 to about 10 weight percent of magnesium hydroxide; and about 5 to about 20 weight percent of a triaryl phosphate flame retardant;

wherein all weight percents are based on the total weight of the composition, unless a different weight basis is specified;

wherein the composition has a ribbon tensile strength of at least 15 megapascals measured at 23° C. according to JIS K6251;

wherein the composition retains at least 60 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790.

41. The composition of claim 40, having a ribbon tensile strength of 15 to 37.1 megapascals, a ribbon tensile strength retention of 60 to 77.1 percent after kerosene/oil immersion, and a flexural modulus of 425 to 900 megapascals.

42. An article comprising the composition of claim 1.
43. An article comprising the composition of claim 34.
44. An article comprising the composition of claim 36.
45. An article comprising the composition of claim 38.
46. An article comprising the composition of claim 40.
47. A tube for sheathing an automotive wiring harness, comprising the composition of claim 1.
48. A tube for sheathing an automotive wiring harness, comprising the composition of claim 34.
49. A tube for sheathing an automotive wiring harness, comprising the composition of claim 36.
50. A tube for sheathing an automotive wiring harness, comprising the composition of claim 38.
51. A tube for sheathing an automotive wiring harness, comprising the composition of claim 40 and having an internal diameter of about 2 to about 30 millimeters and a wall thickness of about 0.2 to about 1.2 millimeter.

52. A method of preparing a thermoplastic composition, comprising:

melt kneading about 10 to about 35 weight percent of a poly(arylene ether);

about 15 to about 40 weight percent of a polyolefin;

about 10 to about 35 weight percent of an acid-functionalized hydrogenated block copolymer of an alkenyl aromatic compound and a conjugated diene; wherein the acid-functionalized hydrogenated block copolymer has a poly(alkenyl aromatic) content of at least 15 weight percent, based on the total weight of the acid-functionalized hydrogenated block copolymer; and about 0.01 to about 5 weight percent of a polyamine compound;

wherein all weight percents are based on the total weight of the composition, unless a different weight basis is specified;

wherein the composition has a ribbon tensile strength of at least 15 megapascals measured at 23° C. according to JIS K6251;

wherein the composition retains at least 40 percent of its ribbon tensile strength after 20 hours immersion in a 50:50 weight/weight mixture of kerosene and SAE 10W30 motor oil at 50° C.; and wherein the composition has a flexural modulus less than or equal to 900 megapascals measured at 23° C. according to ASTM D790.

53. A method of preparing a thermoplastic composition, comprising:

melt kneading about 15 to about 35 weight percent of a poly(2,6-dimethyl-1,4-phenylene ether) having an intrinsic viscosity of about 0.3 to about 0.6 deciliter per gram, measured at 25° C. in chloroform;

about 20 to about 35 weight percent of a polyolefin selected from the group consisting of polypropylene, high density polyethylene, and combinations thereof;

about 10 to about 30 weight percent of an acid-functionalized hydrogenated block copolymer that is a maleic anhydride-grafted polystyrene-poly(ethylene-butylene)-polystyrene triblock copolymer;

wherein the acid-functionalized hydrogenated block copolymer has a weight average molecular weight of 200,000 to about 400,000 atomic mass units and a polystyrene content of about 25 to about 35 weight percent based on the total weight of the acid-functionalized hydrogenated block copolymer;

about 1 to about 8 weight percent of an unfunctionalized polystyrene-poly(ethylene/butylene)-polystyrene triblock copolymer;

about 0.01 to about 5 weight percent of a polyethyleneimine having a number average molecular weight of about 100 to about 1,000,000 atomic mass units;

about 1 to about 10 weight percent of melamine polyphosphate;

about 2 to about 10 weight percent of magnesium hydroxide; and about 5 to about 20 weight percent of a triaryl phosphate flame retardant to form a blend; wherein all weight percents are based on the total weight of the composition, unless a different weight basis is specified; and melt filtering the blend through a filter comprising openings with diameters of about 20 micrometers to about 150 micrometers;

wherein the composition has a ribbon tensile strength of at least 15 megapascals measured at 23° C. according to JIS K6251;

wherein the composition retains 46.9 to 77.1 percent of its ribbon tensile strength after 20 hours immersion in a 50:50 weight/weight mixture of kerosene and SAE 10W30 motor oil at 23° C.; and wherein the composition has a flexural modulus of 425 to 900 megapascals measured at 23° C. according to ASTM D790.

54. The method of claim 53, wherein the poly(2,6-dimethyl-1,4-phenylene ether), the acid-functionalized hydrogenated block copolymer, the unfunctionalized polystyrene-poly(ethylene/butylene)-polystyrene triblock copolymer, the polyethyleneimine, the melamine polyphosphate, the magnesium hydroxide, and the triaryl phosphate flame retardant are melt kneaded to form a first blend; and wherein the first blend and the polyolefin are melt kneaded to form a second blend.

* * * * *